(12) United States Patent
Okayama et al.

(10) Patent No.: US 6,300,415 B1
(45) Date of Patent: Oct. 9, 2001

(54) PROPYLENE COMPOSITION, PROCESS FOR PREPARING THE SAME, POLYPROPYLENE COMPOSITION, AND MOLDED ARTICLES

(75) Inventors: Chikashi Okayama; Takanori Nakashima; Masami Kimura; Mayumi Wakata; Kazuhiro Kimura; Toshiki Yamamoto; Hirohisa Ishii; Masataka Sugimoto; Kunio Gouda, all of Ichihara; Yasuhiro Mochizuki, Chiba; Noriaki Saito, Ichihara; Junichiro Yokota, Ichihara; Shouji Kawano, Ichihara; Yasuhiko Nakagawa, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/068,949
(22) PCT Filed: Nov. 22, 1996
(86) PCT No.: PCT/JP96/03433
 § 371 Date: Aug. 14, 1998
 § 102(e) Date: Aug. 14, 1998
(87) PCT Pub. No.: WO97/19135
 PCT Pub. Date: May 29, 1997

(30) Foreign Application Priority Data

| Nov. 24, 1995 | (JP) | 7-305292 |
| Jan. 29, 1996 | (JP) | 8-035639 |
| Apr. 2, 1996 | (JP) | 8-106365 |
| Jun. 13, 1996 | (JP) | 8-174178 |
| Jun. 21, 1996 | (JP) | 8-181141 |
| Jul. 18, 1996 | (JP) | 8-209030 |
| Jul. 18, 1996 | (JP) | 8-209031 |

(51) Int. Cl.$^7$ .............. C08L 23/12; C08L 23/16; C08L 53/00
(52) U.S. Cl. .......... 525/191; 525/197; 525/240; 264/165; 264/239
(58) Field of Search ............. 525/191, 197, 525/240; 264/165, 239

(56) References Cited

U.S. PATENT DOCUMENTS

| 4,211,690 | 7/1980 | Asano et al. . |
| 4,582,878 | 4/1986 | Chiba et al. . |
| 5,077,327 | * 12/1991 | Cecchin et al. ............ 524/68 |
| 5,100,849 | * 3/1992 | Miya et al. ............... 502/9 |
| 5,122,490 | 6/1992 | Uwai et al. . |
| 5,409,992 | * 4/1995 | Eppert, Jr. ............... 525/88 |
| 5,910,539 | * 6/1999 | Matsunaga et al. ............ 525/88 |

FOREIGN PATENT DOCUMENTS

| 0 457 455 | 11/1991 | (EP) . |
| 0 588 581 | 3/1994 | (EP) . |
| 52-126450 | 10/1977 | (JP) . |
| 60-28411 | 2/1985 | (JP) . |
| 1-272612 | 10/1989 | (JP) . |
| 3-119003 | 5/1991 | (JP) . |
| 3-205439 | 9/1991 | (JP) . |
| 3-220251 | 9/1991 | (JP) . |
| 4-103604 | 4/1992 | (JP) . |
| 4-282232 | 10/1992 | (JP) . |
| 5-54861 | 8/1993 | (JP) . |
| 5-331327 | 12/1993 | (JP) . |
| 6-25367 | 2/1994 | (JP) . |
| 6-116391 | 4/1994 | (JP) . |
| 6-93061 | 4/1994 | (JP) . |
| 6-93062 | 4/1994 | (JP) . |
| 6-145268 | 5/1994 | (JP) . |
| 6-313048 | 11/1994 | (JP) . |
| 6-328640 | 11/1994 | (JP) . |
| 7-25860 | 3/1995 | (JP) . |
| 7-30145 | 4/1995 | (JP) . |
| 7-173233 | 7/1995 | (JP) . |
| 7-100751 | 11/1995 | (JP) . |
| 8-27238 | 1/1996 | (JP) . |
| 8-100037 | 4/1996 | (JP) . |
| 2733060 | 12/1997 | (JP) . |

* cited by examiner

Primary Examiner—Nathan M. Nutter
(74) Attorney, Agent, or Firm—McDermott, Will & Emery

(57) ABSTRACT

A polypropylene composition for the production of various molded articles which are excellent in moldability, mold shrinkage factor on molding, rigidity, flexibility, impact resistance, in particular low-temperature impact resistance, transparency, gloss, stress-whitening resistance, and the balance thereof; various molded articles having the above properties; a propylene composition which is suitable for a base resin for the polypropylene composition; and a process for the production thereof. The propylene composition comprises a propylene homopolymer and a propylene-ethylene copolymer, the intrinsic viscosity of the copolymer ($[\eta]_{RC}$) is in the range of 1.7 to 2.8 dl/g, the intrinsic viscosity ratio of the homopolymer to the copolymer ($[\eta]_{RC}/[\eta]_{PP}$) is in the range of 0.7 to 1.2 and a product $[(W_{PP}/W_{RC}) \times ([\eta]_{RC}/[\eta]_{PP})]$ of the weight ratio ($W_{PP}/W_{RC}$) of the homopolymer to the copolymer and the intrinsic viscosity ratio thereof is in the range of 1.0 to 3.0.

30 Claims, 3 Drawing Sheets

PROPYLENE COMPOSITION, PROCESS FOR PREPARING THE SAME, POLYPROPYLENE COMPOSITION, AND MOLDED ARTICLES

RELATED APPLICATIONS

The present application is a 371 continuation application of PCT/JP96/03433 filed Nov. 22, 1996 which claims priority to JP7-305292 filed Nov. 24, 1995, JP8 035639 Jan. 29, 1996, JP8-106365 Apr. 2, 1996, JP8-174178 Jun. 13, 1996, JP8-181141 Jun. 21, 1996, JP8-209030 Jul. 18, 1996, JP8-209031 Jul. 18, 1996, all of which are incorporated in their entirety by reference hereby.

TECHNICAL FIELD OF THE INVENTION

This invention relates to propylene compositions, more specifically propylene compositions comprising a propylene homopolymer and a propylene-ethylene copolymer, processes for the production thereof, polypropylene compositions based on said propylene composition and molded articles from those compositions, particularly injection molded articles, extruded sheets, films and blow molded articles.

BACKGROUND OF THE ART

Polypropylene resins are relatively cheap and have good properties, and so have a widespread use such as various molded articles, e.g., injection molded articles such as sheets, containers, caps and those having a hinge structure; films; and blow molded articles such as air ducts. Films of polypropylene resins have been extensively employed as packaging materials for foods and fiber products, taking advantage of their mechanical, optical and thermal properties.

In compliance with the properties required for the molding applications, there have been used polypropylene compositions, each based on propylene homopolymer; random copolymers of propylene and α-olefins, especially ethylene; and propylene homopolymer/propylene-α-olefin copolymer.

In general, propylene homopolymer has high rigidity, good heat resistance, but insufficient flexibility, poor impact resistance, especially low-temperature impact resistance and poor tear strength when it is formed into films. Random copolymers of propylene and α-olefins have good, transparency and good flexibility, but poor heat resistance and poor low-temperature impact resistance. Since known propylene compositions comprising a propylene homopolymer and a propylene-ethylene copolymer have good heat resistance and low-temperature impact resistance, they have been extensively employed in a wide variety of industrial fields including automobiles and appliances. However, they are inferior in transparency and gloss to homopolymer, but have high mold shrinkage factor like homopolymer, and also they are inferior in tear strength and flexibility to copolymers. In any case, a phenomenon of whitening is observed in said known compositions when impacting and bending, and their whitening resistance is insufficient.

The methods to improve their insufficient properties include a method of modifying the properties of homopolymers, copolymers or compositions and a method using additives.

For example, a general method has been employed wherein the mold shrinkage factor of the composition is improved by filling with inorganic materials, such as talc. However, the method requires a large quantity of inorganic materials such as talc to improve the mold shrinkage factor, which results in an increased weight of the molded article and a remarkably poor appearance. Further, a method has been employed wherein an ethylene content in the copolymer of the composition is lowered to improve the transparency and gloss. However, it is general that lowering the ethylene content in the copolymer contributes to an improvement in gloss, with the reduction in low-temperature impact resistance and rigidity.

JP-A-60-28411 discloses a process of producing a high-rigidity ethylene-propylene copolymer, i.e., a propylene composition wherein propylene and ethylene are copolymerized in three consecutive stages with varying the ethylene content. The composition obtained by this process has high rigidity, good whitening resistance, good impact resistance and good heat resistance, but more improvements are required in the transparency, gloss, appearance of the molded articles and mold shrinkage factor on molding.

JP-B-7-30145 discloses a propylene block copolymer, i.e., a propylene composition which comprises a crystalline polypropylene block and an ethylene-propylene random copolymer block, the content of the crystalline polypropylene component being 55–95 wt. %, the ratio of the intrinsic viscosities of both components ($[\eta]_{EP}/[\eta]_{PP}$) being 0.5–2.0 and a glass transition temperature of the ethylene-propylene random copolymer being −30° C. or lower. This composition has substantially the same range in respect of the content of the ethylene-propylene copolymer and the ratio of the intrinsic viscosity of the propylene homopolymer to that of the copolymer, has good mechanical properties such as impact resistance and rigidity, but more improvements are required in the transparency, gloss and appearance, especially stress-whitening resistance of the molded articles, and the mold shrinkage factor on molding.

JP-A-6-93061 discloses a melt-kneaded polypropylene block copolymer obtained by polymerizing a monomer based on propylene to form a polymer comprising polypropylene (component A) in an amount of 60–80% by weight to the total polymer amount, and then polymerizing a mixture of ethylene and propylene to form an ethylene-propylene copolymer (component B) having an ethylene content of 20–50% by weight, and melt-kneading the resulting polypropylene block copolymer, wherein the intrinsic viscosity ($[\eta_B]$) of the ethylene-propylene copolymer is at least 2.0 dl/g and the ratio ($[\eta]_B/[\eta]_A$) Of the intrinsic viscosity of the component B to the component A is 1.8 or less. This composition has substantially the same range in respect of the content of the ethylene-propylene copolymer and the ratio of the intrinsic viscosity of the propylene homopolymer to the copolymer, has good low-temperature impact resistance, good blocking resistance and good appearance, but more improvements are required in mechanical properties such as rigidity and mold shrinkage factor on molding.

JP-A-6-328640 discloses a multilayered film with a largely improved tear strength wherein a polypropylene resin layer is laminated on both surfaces of a straight chain low-density polyethylene layer. In the multilayered film, a compatibility of,the laminating low-density polyethylene with polypropylene resin may be not substantially good, and so fish eye is easy to occur when the film is remelted and reused.

JP-A-52-126450 discloses a blend of three components comprising an ethylene-α-olefin copolymer rubber, polypropylene or high-density polyethylene and paraffin or naphthene oil. This blend has good flexibility, but lower heat resistance.

JP-A-4-282232 discloses a resin tubular body wherein a rigid portion produced from a rigid polyolefin resin and a flexible portion produced from a thermoplastic elastomer are connected in series with each other. This tubular body may be insufficient in the bonding strength between the rigid portion and the flexible portion.

OBJECT OF THE INVENTION

An object of the invention is to provide a propylene composition suitable for a base resin for a polypropylene composition having various excellent properties of molded articles such as impact resistance, especially low-temperature impact resistance, rigidity, tear strength, heat resistance, transparency, gloss and stress-whitening resistance, etc., and excellent balance of said properties as well as mold shrinkage factor on molding, and also a process for the production of the propylene composition.

Another object of the invention is to provide a polypropylene composition comprising the propylene composition as a base resin.

Further object of the invention is to provide a variety of molded articles from the polypropylene composition and a process for the production thereof.

SUMMARY OF THE INVENTION

The present inventors have studied the propylene type compositions to achieve the above-mentioned objects, and found that a propylene composition produced by subjecting propylene alone and then a mixture of propylene and ethylene to a continuous vapor phase polymerization in the presence of a catalyst for a stereo regular olefin polymerization comprising a titanium-containing solid catalyst component of a large particle size, is excellent in respect of impact resistance, especially low-temperature impact resistance, rigidity, transparency, stress-whitening resistance, mold shrinkage factor on molding as well as balance of said properties, when an intrinsic viscosity of the propylene-ethylene copolymer, an intrinsic viscosity ratio of both components and a product of the intrinsic viscosity ratio and the weight ratio of both components are in a certain range.

The present invention relates to a propylene composition (A) comprising a propylene homopolymer (PP) and a propylene-ethylene copolymer (RC), characterized in that an intrinsic viscosity ($[\eta]_{RC}$) of the propylene-ethylene copolymer is in the range of 1.7 to 2.8 dl/g, the ratio ($[\eta]_{RC}/[\eta]_{PP}$) of an intrinsic viscosity of the propylene-ethylene copolymer (RC) to an intrinsic viscosity of the propylene homopolymer (PP) is in the range of 0.7 to 1.2 and a product $[(W_{PP}/W_{RC}) \times ([\eta]_{RC}/[\eta]_{PP})]$ of the weight ratio ($W_{PP}/W_{RC}$) of the propylene homopolymer (PP) to the propylene-ethylene copolymer (RC) and the intrinsic viscosity ratio ($[\eta]_{RC}/[\eta]_{PP}$) thereof is in the range of 1.0 to 3.0.

The invention also relates to a process for the production of the propylene composition (A), which comprises conducting a first polymerization step wherein propylene is singly polymerized in a vapor phase in the presence of a catalyst for a stereoregular olefin polymerization which comprises a combination of (a) a titanium-containing solid catalyst component having an average particle size of 25–300 μm, (b) an organoaluminum compound of the formula $AlR^1_m X_{3-m}$ wherein $R^1$ is a hydrocarbyl group of 1–20 carbons, X is a halogen atom and m is a positive number of $3 \geq m \geq 1.5$, and (c) an organosilicon compound of the formula $R^2_x R^3_y Si(OR^4)_z$ wherein $R^2$ and $R^4$ are a hydrocarbyl group, $R^3$ is a hydrocarbyl group or a hydrocarbyl group containing a hetero atom, X, Y and Z have a relationship of $0 \leq X \leq 2$, $1 \leq Y \leq 3$, $1 \leq Z \leq 3$, and $X+Y+Z=4$, to produce 78–60 wt. % of a propylene homopolymer (PP) on the total weight basis of the composition, and then conducting a second polymerization step wherein ethylene and propylene are copolymerized, to produce 22–40 wt. % of a propylene-ethylene copolymer (RC) having an ethylene unit of 25–55 wt. %, on the total weight basis of the composition.

The invention further relates to a polypropylene composition (C) which comprises the above-mentioned propylene composition (A) as a main component and an additive to be added, if desired.

The invention further relates to a molded article (D) from the polypropylene composition, especially an injection molded article, sheets, films and a blow molded article.

EMBODIMENTS OF THE INVENTION

In the propylene composition (A) of the invention, the propylene homopolymer (PP) is a high crystalline, i.e., stereoregular polypropylene having an isotactic pentad (P) of not less than 0.95, preferably not less than 0.955. The isotactic pentad (P) of the propylene homopolymer (PP) has an effect on the mechanical properties of the molded articles (D) such as rigidity, heat resistance, etc. Higher pentad value provides higher rigidity and heat resistance.

The propylene-ethylene copolymer (RC) is an ethylene-propylene random copolymer containing the ethylene polymeric unit of 25 to 55 wt. %, preferably 30 to 55 wt. % on the weight basis of the copolymer (RC). The ethylene polymeric unit in the propylene-ethylene copolymer (RC) has an effect on the rigidity, flexibility, impact resistance, especially low-temperature impact resistance, and stress-whitening resistance of the molded articles (D). Higher ethylene polymeric unit provides more improved flexibility and impact resistance. However, excessive unit affects the dispersibility of propylene-ethylene copolymer (RC) in propylene homopolymer (PP), which results in lowering the transparency, gloss and stress-whitening resistance, etc. of the molded articles (D).

For the propylene-ethylene copolymer (RC), the intrinsic viscosity ($[\eta]_{RC}$) as determined in tetralin at 135° C. is in the range of 1.7 to 2.8 dl/g, and the ratio ($[\eta]_{RC}/[\eta]_{PP}$) of the intrinsic viscosity ($[\eta]_{RC}$) of the copolymer to the intrinsic viscosity ($[\eta]_{PP}$) of propylene homopolymer as determined under the same condition is in the range of 0.7 to 1.2, preferably 0.8 to 1.2.

Since the intrinsic viscosity ($[\eta]$, $_{RC}$) of propylene-ethylene copolymer (RC) cannot be directly measured, it is derived from the intrinsic viscosity ($[\eta]_{PP}$) of propylene homopolymer (PP) which can be directly measured, the intrinsic viscosity ($[\eta]_{WHOLE}$) of the whole propylene composition (A) and the weight % ($W_{RC}$) of propylene-ethylene copolymer (RC), in accordance with the following equation.

$$[\eta]_{RC} = \{[\eta]_{WHOLE} - (1 - W_{RC}/100)[\eta]_{PP}\}/(W_{RC}/100)$$

The intrinsic viscosity ($[\eta]_{RC}$) of propylene-ethylene copolymer (RC) has an effect on the molding cycle of the polypropylene composition (C), the film-forming property when it is formed into film, and the mechanical properties of molded articles (D) such as rigidity, heat resistance, etc. The ratio [$[\eta]_{RC}/[\eta]_{PP}$] of the intrinsic viscosity of propylene-ethylene copolymer (RC) to propylene homopolymer (PP)

affects the dispersibility of propylene-ethylene copolymer (RC) in propylene homopolymer (PP). Higher intrinsic viscosity ($[\eta]_{RC}$) of propylene-ethylene copolymer (RC) provides more improved mechanical properties of molded articles (D), but lowers the molding cycle of the polypropylene composition. If the ratio $[[\eta]_{RC}/[\eta]_{PP}]$ of the intrinsic viscosity of said copolymer to that of propylene homopolymer (PP) is too high or too low, the low-temperature impact resistance and stress-whitening resistance of molded articles (D) become insufficient. Further, if it is too low, the flexibility of molded article (D) becomes insufficient. If it is too high, the improvement effect in the mold shrinkage factor of the polypropylene composition (C) and the transparency of the molded article (D) lowers, so that the desired properties cannot be obtained.

The propylene-ethylene copolymer (RC) contains not less than 80 wt. %, preferably 85 wt. % of a component soluble in xylene at 20° C., on the weight basis of the propylene-ethylene copolymer (RC). Since the weight % ($CXS_{RC}$) of the component soluble in xylene at 20° C. in the propylene-ethylene copolymer (RC) cannot be directly measured, it is derived from the weight % ($CXS_{PP}$) of the component soluble in xylene at 20° C. in the propylene homopolymer (PP), the weight % ($CXS_{WHOLE}$) of the component soluble in xylene at 20° C. in the whole composition (A) and the weight % ($W_{RC}$) of the propylene-ethylene copolymer (RC), in accordance with the following equation.

$$CXS_{RC}=\{CXS_{WHOLE}-(1-W_{RC}/100)CXS_{PP}\}/(W_{RC}/100)$$

In the propylene composition (A) of the present invention, the weight ratio ($W_{PP}/W_{RC}$) of propylene homopolymer (PP) to propylene-ethylene copolymer (RC) is such that a product $[[\eta]_{RC}/[\eta]_{PP}]\times(W_{PP}/W_{RC})$ of said weight ratio ($W_{PP}/W_{RC}$) and the intrinsic viscosity ratio $[[\eta]_{RC}/[\eta]_{PP}]$ of both components is in the range of 1.0 to 3.0.

The product of the weight ratio and the intrinsic viscosity of both components is an index showing the mold shrinkage factor of the polypropylene composition (C). Lower product value provides more improved mold shrinkage factor as well as tear strength and weld strength of molded articles (D), but provides a great reduction in heat resistance and rigidity of molded article (D). On the other hand, higher product value lowers the stress-whitening resistance and does not provide the desired mold shrinkage factor as well as the improvement effects in tear strength and weld strength.

More specifically, the propylene composition (A) comprises 22 to 40 wt. %, preferably 25 to 40 wt. % of propylene-ethylene copolymer (RC), on the weight basis of the composition (A).

The propylene composition (A) has a narrow dispersing molecular-weight distribution wherein Q value (Mw/Mn) is not more than 5, preferably not more than 4.5. Wider molecular weight distribution lowers the gloss and weld strength of molded articles (D).

The propylene composition (A) of the present invention satisfying the above-mentioned various properties is suitably used as a base resin in the polypropylene composition (C) for the manufacture of molded articles having excellent mechanical properties such as mold shrinkage factor on molding and film-forming property, as well as transparency, gloss, rigidity, flexibility, impact resistance, especially low-temperature impact resistance, tear strength, weld strength, and excellent balance of the properties.

The propylene composition (A) of the invention may be produced by any method, if it satisfies the above-mentioned properties. For example, the composition can be prepared by mixing propylene homopolymer (PP) and propylene-ethylene copolymer (RC) as produced separately, in a mixing equipment, but it can be suitably prepared by the processes of the present invention.

The process for the production of the propylene composition (A) according to the present invention is characterized by producing the propylene homopolymer in a vapor phase in a first stage in the presence of a catalyst for a stereoregular olefin polymerization which comprises (a) a titanium-containing solid catalyst component, (b) an organoaluminum compound and (c) an organosilicon compound (first polymerization step) and successively producing the propylene-ethylene copolymer (second polymerization step).

In the process of the present invention, as (a) the titanium-containing solid catalyst component can be used any known components, so long as they are titanium compounds supported on an inorganic carrier such as magnesium, silica and aluminum compounds, or an organic carrier such as polystyrene, and those supported on such carriers reacted with an electron donor compound such as ethers and esters, as is necessary.

For example, the catalyst components (a) can include the titanium-containing solid catalyst components produced by spraying an alcohol solution of a magnesium compound, partially drying a solid component and treating the-dry solid component with titanium halides and an electron donor compound (JP-A-3-119003) and the titanium-containing solid catalyst component prepared by dissolving a magnesium compound in tetrahydrofuran/alcohol/ electron donor and treating magnesium precipitated by a $TiCl_4$ alone or a combination thereof with an electron donor, with titanium halides and electron donor compounds (JP-A-4-103604).

As the titanium-containing solid catalyst component (a) are used those having an average particle size of 25 to 300 $\mu$m, preferably 30 to 150 $\mu$m. If the average particle size of the titanium-containing solid catalyst component is not more than 25 $\mu$m, the flowability of the powder of the propylene composition (A) is remarkably lost, thus resulting in the contamination within the polymerization system by adhesion of the powders to the wall of the polymerization reactor and the agitating element, etc., and further resulting in difficulty in the transfer of the powders discharged from the polymerization reactor, which leads to a great hindrance to a steady operation.

For the titanium-containing catalyst component (a) are preferable those having the uniformity of not more than 2.0 in the normal distribution. If the uniformity exceeds 2.0, the powder flowability of the propylene composition (A) get worse, so that the steady operation continuing the first polymerization step and the second polymerization step becomes difficult.

As the organoaluminum compound (b) can be used the organoaluminum compounds of the formula $AlR^1{}_mX^{3-m}$ wherein $R^1$ is a hydrocarbyl group of 1–20 carbons, X is a halogen atom and m is a positive number of $3 \geq m \geq 1.5$.

Specifically, the following compounds are recited; trimethylaluminum, triethylaluminum, tri-n-propylaluminum, tri-n-butylaluminum, tri-iso-butylaluminum, dimethylaluminum chloride, diethylaluminum chloride, methylaluminum sesquichloride, di-n-propylaluminum monochloride, ethylaluminum sesquichloride, ethylaluminum dichloride, diethylaluminum iodide, ethoxydiethylaluminum, etc. Preferably, triethylaluminum is used.

These organoaluminum compounds may be used alone or in admixture with two or more kinds.

As the organosilicon compound (c) can be used the organosilicon compounds of the formula $R^2{}_xR^3{}_ySi(OR^4)_z$ wherein $R^2$ and $R^4$ are a hydrocarbyl group, $R^3$ is a hydrocarbyl group or a hydrocarbyl group containing a hetero atom, X, Y and Z have the relationship of $0 \leq X \leq 2$, $1 \leq Y \leq 3$, $1 \leq Z \leq 3$ and $X+Y+Z=4$.

Specifically, the following compounds are recited, methyltrimethoxysilane, ethyltrimethoxysilane, n-propyltrimethoxysilane, phenylmethyldimethoxysilane, t-butyltrimethoxysilane, phenyltriethoxysilane, methylethyldimethoxysilane, methylphenyldiethoxysilane, dimethyldimethoxysilane, dimethyldimethoxysilane, diisopropyldimethoxysilane, diisobutyldimethoxysilane, di-t-butyldimethoxysilane, diphenyldimethoxysilane, trimethylmethoxysilane, cyclohexylmethyldimethoxysilane, trimethylmethoxysilane, etc. Preferably, diisobutyldimethoxysilane, diisopropyldimethoxysilane, di-t-butyldimethoxysilane, cyclohexylmethyldimethoxysilane and diphenyldimethoxysilane are used.

These organosilicon compounds may be used alone or in admixture with two or more kinds.

In the process for the production of the propylene composition (A), it is preferable that the titanium-containing solid catalyst component (a) is preactivated by reaction with α-olefins in the presence of an organoaluminum compound (b') and, as is necessary, an organosilane compound (c'), prior to homopolymerization of propylene in the first polymerization step.

For the preactivation of the titanium-containing solid catalyst component (a), the amount of the organoaluminum compound (b') used is not limited, but the compound (b') is usually used in the range of 0.1 to 40 mols, preferably 0.3 to 20 mols per mol of a titanium atom in the titanium-containing solid catalyst component, and it is reacted at 10–80° C. over a period of 10 minutes to 48 hours with a α-olefin in an amount of 0.1 to 100 grams, preferably 0.5 to 50 grams based on 1 g of the titanium-containing solid catalyst component.

For the preactivation, the organosilane compound (c') may be previously used in the range of 0.01 to 10 mols, preferably 0.05 to 5 mols per mole of the organoaluminum compound.

The organoaluminum compounds (b') used in the preactivation can include the above-illustrated organoaluminum compounds (b) used for the polymerization of propylene. As the organoaluminum compounds (b') can be used the kinds same as or different from the organoaluminum compound (b) used in the polymerization of propylene. Preferably, triethylaluminum is used.

The organosilane compound (c') used in the preactivation as is necessary can include the same kinds as the above-recited organosilicon compounds (c). As the organosilane compounds (c') can be used the kinds same as or different from the organosilicon compound (c) used in the polymerization of propylene. Preferably, diisobutyldimethoxysilane, diisopropyldimethoxysilane, di-t-butyldimethoxysilane, cyclohexylmethyldimethoxysilane and diphenyldimethoxysilane are used.

α-olefins used in the preactivation of the titanium-containing solid catalyst component (a) are ethylene, propylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, 3-methyl-1-pentene, etc. These olefins may be used alone or in admixture with two or more kinds. In the polymerization, a molecular weight modifier such as hydrogen can be used in combination to modify the molecular weight of the polymer.

The inert solvents used in the preactivation of the titanium-containing solid catalyst component (a) are those which do not give a remarkable effect on the polymerization reaction, including liquid saturated hydrocarbons such as hexane, heptane, octane, decane, dodecane and liquid paraffin and a silicone oil having a dimethylpolysiloxane structure. These inert solvents may be a single solvent or a mixed solvent of two or more kinds.

It is preferable to use these inert solvents after removal therefrom of impurities adversely affecting the polymerization, such as water and sulfur compounds.

In the process for the production of the propylene composition (A) according to the present invention, there are successively carried out the first polymerization step wherein propylene is polymerized in a vapor phase in the presence of the preactivated titanium-containing solid catalyst component (a) to produce a propylene homopolymer (PP) and then the second polymerization step wherein ethylene and propylene are copolymerized to produce a propylene-ethylene copolymer (RC). The first polymerization step is not limited to a vapor phase polymerization, and may use a slurry polymerization and a bulk polymerization. The subsequent second polymerization step is preferably a vapor phase polymerization. Therefore, the first polymerization step also preferably uses a vapor phase polymerization. In case where slurry and bulk polymerizations are used as the second polymerization step, the propylene-ethylene copolymer (RC) dissolves out in the solution, which results in the difficulty in the continuation of a stable operation.

The polymerization conditions for the propylene homopolymer (PP) are varied depending on a polymerization process. For the vapor phase polymerization process, propylene is polymerized at a polymerization temperature of 20 to 120° C., preferably 40 to 100° C. and a polymerization pressure of from atmospheric pressure to 9.9 MPa, preferably 0.59 to 5.0 MPa in the presence of a stereoregular catalyst comprising (a) a titanium-containing solid catalyst component-which has been preactivated by mixing and agitating prescribed amounts of powders, (b) an organoaluminum component and (c) an organosilicon compound, to produce a propylene homopolymer (A). The ratio, Al/Ti of (b) the organoaluminum compound used to (a) the titanium-containing solid catalyst component used is 1–500 (molar ratio), preferably 10–300. In this case, the number of molrs of (a) the titanium-containing solid catalyst component refers to substantially the number of g atoms of Ti in (a) the titanium-containing solid catalyst component.

The ratio, b/c of (c) the organosilicon compound used to (b) the organoaluminum component used is 1–10 (molar ratio), preferably 1.5–8.

If the molar ratio of b/c is too high, the crystallizability of propylene homopolymer (PP) lowers, resulting in insufficient rigidity of (D) a molded article. If the molar ratio of b/c is too low, the polymerization activity lowers remarkably, resulting in lowered productivity.

To modify the molecular weight of propylene homopolymer (PP), a molecular weight modifier such as hydrogen can be used upon polymerization. It is performed so that the intrinsic viscosity of propylene homopolymer (PP) can meet the requirements for the present invention. After the propylene homopolymer (PP) was polymerized, a part of the resultant powders is taken out and used for the measurement of the intrinsic viscosity ($[\eta]_{PP}$), melt flow rate ($MFP_{PP}$), amount of a soluble component in xylene at 20° C., isotactic pentad (P) and polymerization yield per weight of catalyst.

Subsequently to the homopolymerization of propylene in the first polymerization step, the second polymerization step is carried out wherein a mixed monomer of ethylene and propylene is copolymerized at a polymerization temperature of 20 to 120° C., preferably 40 to 100° C. and a polymerization pressure of from atmospheric pressure to 9.9 MPa, preferably 0.59 to 5.0 MPa, to produce a propylene-ethylene copolymer (RC). The ethylene content in the propylene-ethylene copolymer (RC) is adjusted so as to provide 25 to 55 wt. %, by controlling a gas molar ratio of an ethylene monomer to a propylene monomer in the comonomer gas.

The weight of the propylene-ethylene copolymer (RC) relative to the weight of the propylene homopolymer (PP) is adjusted so as to provide 22 to 40 wt. %, by controlling the polymerization time and using an agent for regulating the polymerization activity of the catalyst such as carbon monoxide and hydrogen sulfide. Further, the molecular weight of the propylene-ethylene copolymer (RC) is regulated so that the intrinsic viscosity of the propylene-ethylene copolymer (RC) can meet the requirements for the propylene composition (A), by adding a molecular weight imodifier such as hydrogen upon the polymerization of the propylene-ethylene copolymer. Hydrogen is fed so that the Q value (Mw/Mn) of the propylene composition (A) can meet the requirements for the propylene composition (A).

The polymerization system may be any of batch, semi-continuous and continuous systems, but a continuous polymerization is industrially preferable.

After completion of the second polymerization step, the monomer can be removed from the polymerization system to prepare a particulate polymer. The resultant polymer is used for the measurement of the intrinsic viscosity ($[\eta]_{WHOLE}$), amount of the soluble component in xylene at 20° C., Q value (Mw/Mn), ethylene content and polymerization yield per weight of the catalyst.

The polypropylene composition (C) of the present invention is the composition comprising said propylene composition (A) as a base resin in which a desired additive component is incorporated in compliance with the required properties for the molded article and the molding method.

The polypropylene composition (C) of the present invention may usually contain, within the range that would not adversely affect the object of the invention, various types of additives commonly employed for polyolefin compositions, such as antioxidants, for example, phenol-, thioether- or phosphorous antioxidants; dispersing agents or neutralizing agents, for example, higher aliphatic acid salts (metal soaps), e.g., calcium stearate; light stabilizers; heavy metal inactivators (copper pollution inhibitors); crystal nucleating agents; lubricants such as stearic acid amides; antistatic agents such as aliphatic acid esters, e.g., glycerol monostearate; anti-fogging agents; flame retardants; auxiliaries for flame retardants; pigments; halogen scavengers; organic or inorganic antibacterial agents; inorganic fillers and anti-blocking agents; for example, talc, mica, clay, wollastonite, zeolite, kaolin, bentonite, perlite, diatomaceous earth, asbestos, calcium carbonate, magnesium carbonate, aluminum hydroxide, magnesium hydroxide, hydrotalcite, basic aluminum lithium hydroxycarbonate hydrate, silicon dioxide, titanium dioxide, zinc oxide, magnesium oxide, calcium oxide, barium sulfate, magnesium sulfate, calcium silicate, aluminum silicate, glass fibers, potassium titanate, carbon fibers, carbon black, graphite and metallic fibers; coupling agents, e.g., silane-, titanate-, boron-, aluminate- or zircoaluminate-coupling agents, as well as inorganic or organic fillers surface-treated with any of said coupling agents, for example, wood flours, pulps, wastepapers, synthetic fibers, natural fibers.

In general, phenolic antioxidants and/or phosphorus antioxidants, and calcium stearate as neutralizing agents (dispersants) are incorporated in the polypropylene composition (C).

The polypropylene compositions (C) having conventional additives incorporated in the above-mentioned polyolefins can be used as such suitably as a polypropylene composition for injection molding (Ci), a polypropylene composition for sheet forming (Cs) and a polypropylene composition for film forming (Cf).

Increased rigidity and more improved low-temperature impact resistance of the injection molded articles can be achieved by incorporating in the polypropylene composition (Ci) 0.0001 to 1 part by weight, preferably 0.001 to 0.8 part by weight of an α-crystal nucleating agent based on 100 parts by weight of the propylene composition (A).

The α-crystal nucleating agents can include inorganic compounds such as talc, alum, silica, titanium oxide, calcium oxide, magnesium oxide, carbon black, clay minerals; carboxylic acids excluding aliphatic monocarboxylic acids such as malonic acid, succinic acid, adipic acid, maleic acid, azelaic acid, sebacic acid, dodecanic diacid, citric acid, butanetricarboxylic acid, butanetetracarboxylic acid, naphthenic acid, cyclopentanecarboxylic acid, 1-methylcyclopentanecarboxylic acid, 2-methylcyclopentanecarboxylic acid, cyclopentanecarboxylic acid, cyclohexanecarboxylic acid, 1-methylcyclohexanecarboxylic acid, 4-methylcyclohexanecarboxylic acid, 3,5-dimethylcyclohexanecarboxylic acid, 4-butylcyclohexanecarboxylic acid, 4-octylcyclohexanecarboxylic acid, cyclohexanecarboxylic acid, 4-cyclohexane-1,2-dicarboxylic acid, benzoic acid, toluic acid, xylic acid, ethylbenzoic acid, 4-t-butylbenzoic acid, salicylic acid, phthalic acid, trimellitic acid or pyromellitic acid; normal salts or basic salts of said non-aliphatic monocarboxylic acids such as lithium, sodium, potassium, magnesium, calcium, strontium, barium, zinc or aluminum; dibenzylidenesorbitol compounds such as 1.3,2.4-dibenzylidenesorbitol, 1.3-benzylidene-2.4-p-methylbenzylidenesorbitol, 1.3-benzylidene-2.4-p-ethylbenzylidenesorbitol, 1.3-p-methylbenzylidene-2.4-benzylidenesorbitol, 1.3-p-ethylbenzylidene-2.4-benzylidenesorbitol, 1.3-p-methylbenzylidene-2.4-p-ethylbenzylidenesorbitol, 1.3-p-ethylbenzylidene-2.4-p-methylbenzylidenesorbitol, 1.3,2.4-bis(p-methylbenzylidene)sorbitol, 1.3,2.4-bis(p-ethylbenzylidene)sorbitol, 1.3,2.4-bis(p-n-propylbenzylidene)sorbitol, 1.3,2.4-bis(p-i-propylbenzylidene)sorbitol, 1.3,2.4-bis(p-n-butylbenzylidene)sorbitol, 1.3,2.4-bis(p-s-butylbenzylidene)sorbitol, 1.3,2.4-bis(p-t-butylbenzylidene)sorbitol, 1.3-(2'.4'-dimethylbenzylidene)-2.4-benzylidenesorbitol, 1.3-benzylidene-2.4-(2'.4'-dimethylbenzylidene)sorbitol, 1.3,2.4-bis(2'4'-dimethylbenzylidene)sorbitol, 1.3,2.4-bis(3',4'-dimethylbenzylidene)sorbitol, 1.3,2.4-bis(p-methoxybenzylidene)sorbitol, 1.3,2.4-bis(p-ethoxybenzylidene)sorbitol, 1.3-benzylidene-2.4-p-chlorobenzylidenesorbitol, 1.3-p-chlorobenzylidene-2.4-benzylidenesorbitol, 1.3-p-chlorobenzylidene-2.4-p-methylbenzylidenesorbitol, 1.3-p-chlorobenzylidene-2.4-p-ethylbenzylidenesorbitol, 1.3-p-methylbenzylidene-2.4-p-chlorobenzylidenesorbitol, 1.3-p-ethylbenzylidene-2.4-p-chlorobenzylidenesorbitol and 1.3,2.4-bis(p-chlorobenzylidene)sorbitol; arylphosphate compounds such as lithium bis(4-t-butylphenyl)phosphate, sodium bis(4-t-butylphenyl)phosphate, lithium bis(4-cumylphenyl) phosphate, sodium bis(4-cumylphenyl)phosphate, potassium bis(4-t-butylphenyl)phosphate, calcium mono(4-t-butylphenyl)phosphate, calcium bis(4-t-butylphenyl)

phosphate, magnesium mono(4-t-butylphenyl)phosphate, magnesium bis(4-t-butylphenyl)phosphate, zinc mono(4-t-butylphenyl)phosphate, zinc bis(4-t-butylphenyl)phosphate, aluminum dihydroxy-(4-t-butylphenyl)phosphate, aluminum hydroxy-bis(4-t-butyl-phenyl)phosphate, aluminum tris(4-t-butylphenyl)phosphate, sodium 2,2'-methylene-bis(4,6-di-t-butylphenyl)phosphate, sodium 2,2'-ethylidene-bis(4,6-di-t-butylphenyl)phosphate, sodium 2,2'-methylene-bis(4-cumyl-6-t-butylphenyl)phosphate, lithium 2,2'-methylene-bis(4,6-di-t-butylphenyl)phosphate, lithium 2,2'-ethylidene-bis(4,6-di-t-buthylphenyl)phosphate, lithium 2,2'-methylene-bis(4-cumyl-6-t-butylphenyl)phosphate, sodium 2,2'-ethylidene-bis(4-i-propyl-6-t-butylphenyl) phosphate, lithium 2,2'-methylene-bis(4-methyl-6-t-butylphenyl)phosphate, lithium 2,2'-methylene-bis(4-ethyl-6-t-butylphenyl)phosphate, sodium 2,2'-butylidene-bis(4,6-di-methylphenyl)phosphate, sodium 2,2'-butylidene-bis(4,6-di-t-butylphenyl)phosphate, sodium 2,2'-t-octylmethylene-bis(4,6-di-methylphenyl)phosphate, sodium 2,2'-t-octylmethylene-bis(4,6-di-t-butylphenyl)phosphate, sodium 2,2'-methylene-bis(4-methyl-6-t-butylphenyl)phosphate, sodium 2,2'-methylene-bis(4-ethyl-6-t-butylphenyl) phosphate, sodium (4,4'-dimethyl-6,6'-di-t-butyl-2,2'-biphenyl)phosphate, sodium 2,2'-ethylidene-bis(4-s-butyl-6-t-butylphenyl)phosphate, sodium 2,2'-methylene-bis(4,6-di-methylphenyl)phosphate, sodium 2,2'-methylene-bis(4,6-di-ethylphenyl)phosphate, potassium 2,2'-ethylidene-bis(4,6-di-t-butylphenyl)phosphate, calcium bis(2,2'-methylene-bis(4,6-di-t-butylphenyl)phosphate, magnesium bis[2,2'-methylene-bis(4,6-di-t-butylphenyl)phosphate], zinc bis[2,2'-methylene-bis(4,6-di-t-butylphenyl)phosphate], aluminum tris[2,2'-methylene-bis(4,6-di-t-butylphenyl) phosphate], calcium bis[2,2'-methylene-bis(4-methyl-6-t-butylphenyl)phosphate], calcium bis[2,2'-ethylidene-bis(4,6-di-t-butylphenyl)phosphate], calcium bis[2,2'-thiobis(4-methyl-6-t-butylphenyl)phosphate], calcium bis[2,2'-thiobis(4-ethyl-6-t-butylphenyl)phosphate, calcium bis[2,2'-thiobis(4,6-di-t-butylphenyl)phosphate], magnesium bis[2,2'-thiobis(4,6-di-t-butylphenyl)phosphate], magnesium bis[2,2'-thiobis(4-t-octylphenyl)phosphate], barium bis[2,2'-methylene-bis(4,6-di-t-butylphenyl)phosphate, calcium bis [(4,4'-dimethyl-6,6'-di-t-butyl-2,2'-biphenyl)phosphate], magnesium bis[2,2'-ethylidene-bis(4,6-di-t-butylphenyl) phosphate], barium bis[2,2'-ethylidene-bis(4,6-di-t-butylphenyl)phosphate], aluminum tris[2,2'-ethylidene-bis(4,6-di-t-butylphenyl)phosphate], aluminum dihydroxy-2,2'-methylene-bis(4,6-di-t-butylphenyl)phosphate, aluminum dihydroxy-2,2'-methylene-bis(4-cumyl-6-t-butylphenyl) phosphate, aluminum hydroxy-bis[2,2'-methylene-bis(4,6-di-t-butylphenyl)phosphate], aluminum hydroxy-bis[2,2'-methylene-bis(4-cumyl-6-t-butylphenyl)phosphate], titanium dihydroxy-bis[2,2'-methylene-bis(4,6-di-t-butylphenyl)phosphate], tin dihydroxy-bis[2,2'-methylene-bis(4,6-di-t-butylphenyl)phosphate], zirconium oxy-bis[2,2'-methylene-bis(4,6-di-t-butylphenyl)phosphate, aluminum dihydroxy-2,2'-methylene-bis(4-methyl-6-t-butylphenyl) phosphate, aluminum hydroxy-bis[2,2'-methylene-bis(4-methyl-6-t-butylphenyl)phosphate], aluminum dihydroxy-2,2'-ethylidene-bis(4,6-di-t-butylphenyl)phosphate or aluminum hydroxy-bis[2,2'-ethylidene-bis(4,6-di-t-butylphenyl)phosphate]; mixtures of cyclic polyvalent metal aryl phosphate compounds among the said aryl phosphate compounds with alkali metal salts of aliphatic monocarboxylic acids such as lithium, sodium or potassium salts of aliphatic monocarboxylic acids, for example, acetic acid, lactic acid, propionic acid, acrylic acid, octanoic acid, isooctanoic acid, nonanoic acid, decanoic acid, lauric acid, myristic acid, palmitic acid, stearic acid, oleic acid, linoleic acid, linolenic acid, 12-hydroxystearic acid, ricinolic acid, behenic acid, erucic acid, montanoic acid, melissic acid, stearoyllactic acid, βN-laurylaminopropionic acid, β-N-methyl-N-lauroylaminopropionic acid, or basic aluminum lithium hydroxycarbonate hydrate; polymeric compounds such as poly(3-methyl-1-butene), poly(3-methyl-1-pentene), poly(3-ethyl-1-pentene), poly(4-methyl-1-pentene), poly(4-methyl-1-hexene), poly(4,4-dimethyl-1-pentene), poly(4,4-dimethyl-1-hexene), poly(4-ethyl-1-hexene), poly(3-ethyl-1-hexene), polyallylnaphthalene, polyallylnorbornane, atactic polystyrene, syndiotactic polystyrene, polydimethylstyrene, polyvinylnaphthalene, polyallylbenzene, polyallyltoluene, polyvinylcyclopentane, polyvinylcyclohexane, polyvinylcycloheptane, polyvinyltrimethylsilane or polyallyltrimethylsilane.

Particularly preferable are talc; aluminum hydroxy-bis(4-t-butylbenzoate); 1.3,2.4-dibenzylidene-sorbitol, 1.3,2.4-bis(p-methylbenzylidene)sorbitol, 1.3,2.4-bis(p-ethylbenzylidene)sorbitol, 1.3,2.4-bis(2',4'-dimethylbenzylidene)sorbitol, 1.3,2.4-bis(3',4'-dimethylbenzylidene)sorbitol, 1.3-p-chlorobenzylidene-2.4-p-methylbenzylidenesorbitol, 1.3,2.4-bis(p-chlorobenzylidene)sorbitol; mixtures of aliphatic monocarboxylic acid alkali metal salts with cyclic polyvalent metal arylphosphate compounds such as sodium bis(4-t-butylphenyl)phosphate, sodium 2,2'-methylene-bis(4,6-di-t-butylphenyl)phosphate, calcium 2,2'-methylene-bis(4,6-di-t-butylphenyl)phosphate, aluminum 2,2'-methylene-bis(4,6-di-t-butylphenyl)phosphate, aluminum dihydroxy-2,2'-methylene-bis(4,6-di-t-butylphenyl)phosphate or aluminum hydroxy-bis[2,2'-methylene-bis(4,6-di-t-butylphenyl) phosphate]; poly(3-methyl-1-butene); polyvinylcyclohexane and polyallyltrimethylsilane.

The α-crystal nucleating agent may be used alone or in combination with two or more kinds.

More improved stress-whitening resistance of the injection molded article can be achieved by incorporating a radical generator and/or a crystalline propylene homopolymer (PHP) in the polypropylene composition (Ci).

The crystalline propylene homopolymer (PHP) to be incorporated is the propylene homopolymer having the density of 0.91 to 0.89 g/cm$^3$ and the melt flow rate ratio (MFR$_{WHOLE}$/MFR$_{Ph}$) of the propylene composition (A) to the crystalline propylene homopolymer (PHP) ranging from 0.5 to 2, preferably 0.8 to 1.2.

The MFR ratio of the propylene composition (A) to the crystalline propylene homopolymer (Ph) has an influence on the stress-whitening resistance of the molded articles. Even too high or too low ratio provides insufficient stress-whitening resistance.

The amount of the crystalline propylene homopolymer (PHP) incorporated is 10 to 95% by weight on the resin basis, and the content of the propylene composition (A) is in the range of 5 to 90t by weight on the resin basis from the balance of the rigidity and impact resistance of the molded articles.

In the composition (C), the propylene composition (A) serves as a stress-whitening resistant agent to prevent the whitening of the molded article, and so the composition (C) is suitable for the formation of the molded articles having a folding part such as hinge and cap of a container.

The radical generator causes the compound to be highly fluidized and remarkably improves the moldability.

For the radical generator, it is desirable that the decomposition temperature is not too low to obtain a uniform composition, and the temperature for obtaining a half-life period of 10 hours is 70° C. or higher, preferably 100° C. or higher. For example, the following organic peroxides are recited: benzoyl peroxide, t-butylperbenzoate, t-butylperacetate, t-butylperoxyisopropylcarbonate, 2,5-di-methyl-2,5-di-(t-benzoylperoxy)hexane, 2,5-di-methyl-2,5-di-(t-benzoylperoxy)hexyne-3,t-butyl-di-peradipate, t-butylperoxy-3,5,5-trimethylhexanoate, methyl ethyl ketone peroxide, cyclohexanone peroxide, di-t-butyl peroxide, dicumyl peroxide, 2,5-di-methyl-2,5-di-(t-butylperoxy)hexane, 2,5-di-methyl-2,5-di-(t-butylperoxy) hexyne-3, 1,3-bis-(t-butylperoxyisopropyl)benzene, t-butylcumyl peroxide, 1,1-bis-(t-butylperoxy)-3,3,5-trimethylcyclohexane, 1,1-bis-(t-butylperoxy)cyclohexane, 2,2-bis-(t-butylperoxybutane), p-methane hydroperoxide, di-isopropylbenzene hydroperoxide, cumene hydroperoxide, t-butyl hydroperoxide, p-cymene hydroperoxide, 1,1,3,3-tetra-methylbutyl hydroperoxide and 2,5-di-methyl-2,5-di-(hydroperoxy)hexane. In particular, 2,5-di-methyl-2,5-di-(t-butylperoxy)hexane, 2,5-di-methyl-2,5-di-(t-butylperoxy)hexyne-3 and 1,3-bis-(t-butylperoxyisopropyl)benzene are preferable. The radical generators can be used alone or in combination with two or more kinds. The polypropylene composition (C) having conventional additives incorporated in the above-mentioned olefin can be used as the polypropylene composition (Cb) for the formation of blow molded articles.

The polypropylene composition (Cb) can be incorporated with 5 to 20 parts by weight of a plasticizing component based on 100 parts by weight of the propylene composition (A) to provide the molded article with flexibility.

The plasticizing components (Ps) can include an ethylene homopolymer and ethylene-α-olefin copolymer which are generally called "low-density polyethylene", having the;

density of 0.910 to 0.930 g/cm³, the crystalline melting point (Tm) of 100 to 115° C. and the melt flow rate (MFR: 190° C.; 21.18 N) of 0.1 to 5 g/10 min, preferably 0.1 to 1 g/10 min, and an ethylene-vinyl acetate copolymer having the density of 0.92 to 0.935 g/cm³, the crystalline melting point (Tm) of 90 to 108° C., and the melt flow rate (MFR: 190° C.; 21.18 N) of 0.1 to 5 g/10 min, preferably 0.1 to 1 g/10 min.

Since the incorporation of the plasticizing component provides the molded article with flexibility, the polypropylene composition (Cb) is suitable for the formation of the blow molded articles having a bellows structure and films.

Each polypropylene composition of the present invention as mentioned above is mixed with the propylene composition (A) and if desired, each additive component by means of a high speed mixing apparatus such as Henschel mixer (trade name), ribbon blender, tumbler mixer, etc., and then melt kneaded at a temperature of 150 to 300° C., preferably 200 to 250° C. to form pellets which are used for the formation of a variety of molded articles.

The molded articles of the present invention are those produced by using each of the above polypropylene compositions according to various molding methods.

The molded articles of the first embodiment are injection molded articles. More specifically, these molded articles are those obtained by injection-molding method using pellets of each of the polypropylene compositions into those articles such as sheet-like articles, containers, caps for containers, molded articles with a hinge, and the like.

As the polypropylene compositions for injection molding can be used any of the above-mentioned compositions, but it is preferred to use polypropylene compositions (Ci) for injection molding.

Depending on the aimed molded articles and properties required therefor, the compositions incorporated with an α-crystal nucleating agent, a radical generator and/or a crystalline propylene homopolymer, etc. can be used.

By using these polypropylene compositions (Ci), it is possible to produce an injection molded article which has an excellent stress-whitening resistance at folded portions (such as in hinge constructions), transparency, gloss, regidity, particularly low-temperature impact resistance and molding shrinkage factor on molding, and excellent balance of these properties.

The molded articles according to the second embodiment of the present invention are sheets. In view of printability and flexibility, the sheets have a Young's modulus in a longitudinal direction at 23° C. of 200 to 450 MPa, preferably 300 to 400 MPa, and a tensile strength at yield in a longitudinal direction at 50° C. of not less than 15 MPa, preferably not less than 17 MPa.

The sheets according to the present invention can be produced by any of the known sheet molding methods, but are preferably produced by extrusion molding or calendering because of their good productivity. Specifically, the sheets are molded by T-die extrusion method using an apparatus equipped with extruder, T-die, polishing roll (cooling roll), guide roll, take-off roll, trimming cutter, masking, cutter for cutting in desired lengths, stacker and the like (T-die sheet molding machine), or using an apparatus (calendering machine) equipped with Banburry mixer, mixing roll, warming roll, extruder, calender roll, trimming cutter, masking, cutter for cutting in desired lengths, winder and the like.

More preferably, the polypropylene compositions (C), preferably the polypropylene compositions (Cs) similar to those mentioned for the injection molding are molded by the method for producing the sheets according to the present invention, namely by the T-die method, by extruding at a resin temperature of from 180 to 300° C. and a cooling roll temperature in the range of 5 to 80° C. while setting the temperature difference between the resin temperature and the cooling roll temperature not less than 120° C., and at a sheet speed of 0.1 to 100 m/min.

If the resin temperature is in the range of from 180 to 300° C., the polypropylene compositions (Cs) melt sufficiently without thermal deterioration, whereby the melt tension of the sheets will be maintained to provide a good moldability, and the surface of the resulting sheet will not exhibit shark skin pattern to give sheets with an excellent appearance.

If the cooling roll temperature is not less than 5° C., spot patterns are not formed on the sheet surface because moisture condensation does not occur on the cooling roll. If it is not higher than 80° C., the sheets can be sufficiently cooled and will not have a linear pattern when the sheet is unrolled, whereby sheets with a good appearance are provided.

Because the sheet is weekly molecular-oriented and a difference in heat shrinkage between the longitudinal direction and transverse direction is small, the sheets having an excellent moldability can be obtained by maintaining the following relation between the resin temperature and the cooling roll temperature:

Resin temperature−Cooling roll temperature≧120° C.

If the sheet line speed is not less than 0.1 m/min., sheets with a uniform thickness and a low fraction defective can be obtained with a satisfactory production speed. If it is not more than 100 m/min., the sheets can be sufficiently cooled and linear pattern generation will be prevented upon unrolling, thereby sheets with a good appearance can be obtained.

The molded products according to the third embodiment of the present invention are films produced by molding the above-mentioned polypropylene composition (C), preferably polypropylene composition (Cf) in which conventional additives for polyolefins are added to the propylene compositions (A). The films include unstretched, uniaxially stretched and biaxially oriented films.

The unstretched films can be produced by the T-die method or inflation method which are usually used for production of polyolefin films, and the uniaxially stretched films or biaxially oriented films can be produced by stretching the thus obtained unstretched films by way of uniaxial stretching with a tentering method, or by succesive biaxial orienting or by simultaneous biaxial orienting with a tubular method, respectively.

These films are excellent in low-temperature impact resistance, thermal resistance and tear resistance due to the use of the polypropylene compositions (C) containing as a base resin the propylene compositions of the present invention.

Another embodiment of the films according to the present invention is a multi-layered film wherein a functional polymer layer is laminated on one or both of the surface(s) of the above-mentioned films.

The multi-layered films according to the invention are not specially restricted as long as a polymer layer which can provide a special function is laminated on a film comprising the polypropylene composition (C), but have at least a heat sealing layer.

As the heat sealing layer can be suitably used propylene homopolymers having the density of 0.89 to 0.91 g/cm$^3$ and the crystalline melting point of 165 to 160° C. and/or propylene-α-olefin copolymers having the density of 0.89 to 0.91 g/cm$^3$ and the crystalline melting point of 159 to 110° C.

The melt flow rate (230° C.; 21.18 N) of the polymers used for the heat sealing layer is 0.1 to 50 g/10 min., preferably 1 to 20 g/10 min. from the viewpoints of moldability on molding of the film and appearance of the resulting films. Examples of the α-olefins to be copolymerized with propylene can include ethylene, butene-1, pentene-1, etc.

The propylene-α-olefin copolymers can include ethylene-propylene copolymers containing 0.2 to 10% by weight of ethylene component and ethylene-propylene-butene-1-copolymers containing 0.2 to 10% by weight of ethylene component and 0.4 to 5% by weight of butene-1 component.

The crystalline melting point of the propylene homopolymer is 165 to 160° C. in order to give a multi-layered film having excellent gloss, hardness and rigidity.

The crystalline melting point of the propylene-α-olefin copolymer is 159 to 110° C., preferably 140 to 110° C., in order to give a multi-layered film having an excellent heat-sealing property.

These propylene homopolymers and propylene-α-olefin copolymers can be produced by conventional polymerization methods through homopolymerization of propylene or copolymerization of propylene and an α-olefin using a catalyst formed from a composite containing at least magnesium, titanium and a halogen, an organometal compound of Groups 1 to 3 metals in periodic table and an electron donor.

The multi-layered films according to the present invention are unstretched, uniaxially stretched or biaxially oriented multi-layered films having a layer of the polypropylene composition and the above-mentioned functional polymer layer. The layer configuration of the multi-layered films can include two components-two layers, i.e. functional polymer layer/polypropylene composition layer, and two components-three layers or three components-three layers such as functional polymer layer/polypropylene composition layer/functional polymer layer. Among them, a multi-layered film consisting of propylene homopolymer layer/polypropylene composition layer/propylene-α-olefin copolymer layer is preferred in view of thermal resistance and heat-sealing property of the resulting multi-layered film.

The thickness of the multi-layered film is not specially restricted, but is preferably 10 to 100μ, more preferably 15 to 70μ in view of the moldability of the film. The thickness of each layer in the multi-layered film is not specially restricted, but the ratio of the thickness of the propylene composition layer to the total thickness of the film is 30 to 90%, preferably 50 to 90%, in view of low-temperature impact resistance, thermal resistance and tear strength of the multi-layered film.

The methods for production of the multi-layered films can include a multi-layer extrusion molding method, a dry laminating method, an extrusion laminating method and the like. The multi-layer extrusion molding methods can include a T-die or inflation method which is usually used for production of polyolefin films. The stretching methods include successive biaxial orienting by a tentering method and simultaneous biaxial orienting by a tubular method.

When the multi-layered films are produced according to conventional methods, there is no special restriction in melt flow rates (MFR) of the polypropylene composition and the functional polymer constituting each layer. However, the MFR ratio of the polypropylene composition to the functional polymer is from 0.1 to 10, preferably 0.5 to 2, in view of the moldability of the film and appearance of the film product.

The multi-layered films according to the present invention can be produced by laminating the functional polymer layer onto a transparent base film such as BOPP film, PET film, nylon film or Eberl film through an adhesive by the methods such as dry lamination.

The films and multi-layered films accoding to the present invention can be further subjected to surface treatments such as corona discharge treatment, flame treatment, plasma treatment, etc. by using usual industrially-applicable methods for the purpose of providing printability, lamination adaptability and metallizing property.

The molded articles according to the fourth embodiment of the present invention are blow molded articles made from the above-mentioned polypropylene compositions (C), particularly the compositions (Cb) in which the propylene composition is incorporated with a flexibilizing component.

The blow molded articles preferably have a bellows structure.

The blow molded articles accoding to the present invention can be readily produced by a blow molding process wherein pellets of the polypropylene compositions (C) are supplied to an extruder in a blow molding machine and extruded into a hollow cylindrical article. By using a mold having a rugged surface (bellows) as the mold of the molding machine, a blow molded article with a bellows structure (having the mechanism that expands and contracts) can be readily produced.

Another embodiment of the blow molded articles accoding to the invention is a composite blow molded article wherein a blow molded part having a bellows structure is joined with a blow molded part from a polyolefin composition (PO) having excellent rigidity and impact resistance.

The polyolefin composition (PO) used for the blow molded part to be joined with the bellows structure is the composition wherein a composition comprising 1 to 20% by weight, preferably 10 to 20% by weight of an ethylene-propylene copolymer containing 25 to 55% by weight, preferably 35 to 55% by weight of ethylene polymerization unit and 99 to 80% by weight of a propylene homopolymer is incorporated with an inorganic filler, such as talc, calcium carbonate or calcium silicate to be added for providing the rigidity in the proportion not impairing the object of the present invention. The ratio of the inorganic filler incorporated is preferably not more than 20% by weight on the weight basis of the composition.

The blow molded articles can be produced using an accumulator type blow molding machine equipped with a set of clamping device, one ram cylinder and at least two extruders, by the process comprising supplying the polypropylene composition (C) of the present invention to one of the extruders and supplying the polyolefin composition (PO) to the other extruder, accumulating a molten composition extruded from one of the extruders in the ram cylinder and then a molten composition extruded from the other extruder in the ram cylinder, extruding from the ram cylinder a parison of the molten polypropylene composition (C) in such a fashion that the parison can be introduced into a mold having a rugged surface (bellows), and blowing pressurized air at 0.5 to 1 MPa into the parison.

EXAMPLE

The present invention will be explained below more in detail by way of the examples and comparative examples.

A. Synthesis of Propylene Composition (A)
1) Measurement of Physical Properties During synthesis of the propylene compositions, the physical properties of the intermediate products and the final products were measured according to the following methods.

Conditions for the synthesis and the results of the measurements are shown in Tables 1 and 2.

a) Average particle size ($\mu$m) of titanium-containing solid catalyst component (a): Calculated from a particle distribution measured by using Master sizer (manufactured by MALVERN Corporation).

b) Degree of uniformity of titanium-containing solid catalyst component (a): Calculated by dividing the particle size in 60% undersize by that of 10% undersize which are obtained from the particle distribution measured by using Master sizer (manufactured by MALVERN Corporation).

c) Amount of polymer produced per unit weight of catalyst: Measured by induction bonded plasma spectral analysis (IPC method) of Mg in a sample.

d) Isotactic pentad in the polypropylene molecular chain (P): Measured by means of $^{13}$C-NMR according to Macromolecules 8687 (1975).

e) Ethylene unit content (% by weight): Measured by Infrared absorption spectroscopy.

f) Intrinsic viscosity (dl/g): Measured in a solvent, tetralin (tetrachloronaphthalene), at 135° C. by using automatic viscometer (AVS2-type, manufactured by MITSUI TOATSU CHEMICALS, INC.).

g) Melt flow rate (g/10 min.): Measured according to JIS K 6760.

h) Average molecular weight Q value (Mn/Mw): Measured on a sample dissolved in ortho-dichlorobenze at 135° C. by using GPC apparatus (Gel Permeation Chromatograph, Model 150C, manufactured by Waters Corporation, column: TSK GEL GMH6-HT).

i) Amount of a soluble component in xylene at 20° C. (% by weight): Measured according to ISO/DIS 1873-1.

j) Powder flowability: Compressibility of powders was calculated according to the following equation:

$$\text{Compressibility} = \frac{\left(\begin{array}{c}\text{Apparent compact} - \text{Apparent} \\ \text{density} \quad\quad \text{loose density}\end{array}\right) \times 100}{\text{Apparent compact density}}$$

Higher compressibility provides lower flowability of the powder.

2) Preparation of Titanium-containing Solid Catalyst Component (a)

a) Titanium-containing solid catalyst component: a-1

In a stainless steel autoclave purged with nitrogen were charged anhydrous $MgCl_2$ (95.3 g) and absolute EtOH (352 ml), and the mixture was heated at 105° C. with stirring and dissolved. After stirring was continued for one hour, the resulting solution was introduced to a two-fluids spray nozzle with a pressurized nitrogen gas (1.1 MPa) heated at 105° C. The flow rate of the nitrogen gas was 38 liters/min. Cooling liquid nitrogen was introduced into the spray tower in which the temperature was maintained at −15° C. The product was collected in cooled hexane introduced at the bottom of the tower to give 256 g of the product. The analysis of the product showed that the composition of the carrier was $MgCl_2 \cdot 6EtOH$, which was the same as the starting solution.

For using as a carrier, 205 g of spherical carrier having the particle size of 45 to 212 $\mu$m were taken out by sieving. The carrier was dried by introducing nitrogen gas at the flow rate of 3 liters/min. at room temperature for 181 hours to give a dry carrier composed of $MgCl_2 \cdot 1.7$ EtOH.

The dry carrier (20 g), titanium tetrachloride (160 ml) and purified 1,2-dichloroethane (240 ml) were blended in a glass flask, and heated to 100° C. with stirring. Then di-isobutylphthalate (6.8 ml) was added. After heating the mixture for additional 2 hours at 100° C., a liquid layer was removed by decantation. Again, titanium tetrachloride (160 ml) and purified 1,2-dichloroethane (320 ml) were added and the resulting mixture was maintained at 100° C. by heating for one hour. A liquid layer was removed by decantation, and the residue was washed with purified hexane and dried to give a titanium-containing solid catalyst component: a-1. The average particle size of the titanium-containing solid catalyst component: a-1 was 115 $\mu$m, and the analytical values were as follows: Mg; 19.5% by weight, Ti; 1.6% by weight, Cl; 59.0% by weight, di-isobutylphthalate; 4.5% by weight.

b) Titanium-containing solid catalyst component: a-2

In a stainless steel autoclave purged with nitrogen were charged purified kerosine (1,050 ml), anhydrous $MgCl_2$ (15 g), absolute ethanol (36.3 g) and a surfactant (trade name: EMASOLE 320, produced by KAO ATLAS Co. Ltd.) (4.5 g), and the resulting mixture was elevated with stirring at 800 rpm and maintained at 120° C. for 30 minutes. The molten mixture was transferred to a 3,000 ml flask equipped with a stirrer containing 1,500 ml of purified kerosine cooled to −10° C., using a teflon tube of 5 mm inner diameter while stirring the mixture at a high speed. The product was filtered and then thoroughly washed with hexane to obtain a carrier.

The carrier (15 g) was suspended in titanium tetrachloride (300 ml) at room temperature, di-isobutylphthalate (2.6 ml) was added, and the resulting suspension was raised to 120° C. After stirring and mixing the suspension at 120° C. for two hours, a solid was filtered off and suspended again in titanium tetrachloride (300 ml). After the suspension was stirred and mixed at 130° C. for 2 hours, a solid was filtered off and thoroughly washed with purified hexane to give titanium-containing solid catalyst component: a-2.

The resulting titanium-containing solid catalyst component: a-2 had an average particle size of 72 μm and the following analytical values: Mg; 21.1% by weight, Ti; 2.4% by weight, Cl; 64.15% by weight, di-isobutylphthalate; 5.3% by weight.

c) Titanium-containing solid catalyst component: a-3

A mixture of magnesium ethoxide (300 g), 2-ethylhexanol (550 ml) and toluene (600 ml) was stirred at 93° C. for 3 hours in a carbon dioxide atmosphere of 0.20 MPa. Additional toluene (800 ml) and n-decane (800 ml) were added to obtain a magnesium carbonate solution.

Toluene (800 ml), chlorobenzene (60 ml), tetraethoxysilane (18 ml), titanium tetrachloride (17 ml) and Isopal G (isoparaffin hydrocarbon having an average carbon number of 10, boiling point: 156–176° C.)(200 ml) were stirred at 30° C. for 5 minutes, and then the magnesiun carbonate solution prepared above was added.

After additionally stirring the mixture for 5 minutes, tetrahydrofuran (44 ml) was added, and the resulting mixture was stirred at 60° C. for one hour. After stirring was ceased and a supernatant was removed, the resulting solid was washed with toluene (100 ml), chlorobenzene (200 ml) and titanium tetrachloride (200 ml) were added, and the mixture was stirred at 135° C. for one hour. After stirring was ceased and a supernatant was removed, chlorobenzene (500 ml), titanium tetrachloride (200 ml) and d-n-butylphthalate (4.2 ml) were added, and the mixture was stirred at 135° C. for 1.5 hours. The supernatant was removed and the solid was washed successively with toluene (1,200 ml), Isopal G (1,600 ml), and hexane (800 ml) to obtain titanium-containing solid catalyst component: a-3 for comparison. The resulting titanium-containing solid catalyst component: a-3 had an average particle size of 18.5 μm, with the following analytical values: Mg; 17.0% by weight, Ti; 2.3% by weight, Cl; 55.0% by weight, di-isobutylphthalate; 7.5% by weight.

3) Pre-activation of Titanium-containing Solid Catalyst Component (a)

A 15 liters stainless steel reaction vessel equipped with slant vanes was purged with nitrogen gas, and then charged with a saturated hydrocarbon solvent having a dynamic viscosity of 7.3 centistokes at 40° C. (CRYSTOL-52, manufactured by Esso Sekiyu Co., Ltd.)(8.3 liters), triethyl aluminum (525 mmol), di-isopropyl-di-methoxysilane (80 mmol) and the titanium-containing solid catalyst component as prepared above (700 g) at room temperature. The mixture was warmed to 40° C. and reacted for 7 hours at a propylene partial pressure of 0.15 PMa to pre-activate the catalyst. The result of the analysis indicated that 3.0 g of propylene was reacted per 1 g of the titanium-containing solid catalyst component.

4) Synthesis of Propylene Homopolymer (PP): First Polymerization Step

Referring to the flow sheet shown in FIG. 3, a horizontal polymerization reactor equipped with stirring vanes 1 (L/D= 6, inside volume: 100 liters) was fed continuously with the pre-activated titanium-containing solid catalyst component at the rate of 0.5 g/hr, triethyl aluminum as the organoaluminum compound (b) and di-isopropyl-di-methoxysilane as the organosilicon compound (c) in such a ratio as to give the Al/Si molar ratio shown in Tables 1 and 2. Propylene was continuously fed to maintain the conditions of the reaction temperature at 70° C., the reaction pressure at 2.5 MPa and the stirring speed at 40 rpm, and hydrogen gas was continuously fed through circulation pipe 2 to adjust the molecular weight of the resulting propylene homopolymer and the intrinsic viscosity of the propylene homopolymer was controlled with the hydrogen concentration in the vapor phase within the reactor.

Reaction heat was removed by evaporation of the starting propylene supplied through piping 3. Unreacted gases discharged from the polymerization reactor was cooled and condensed outside the reaction system via piping 4 and returned to polymerization reactor 1.

The propylene homopolymer obtained in the polymerization reactor was continuously taken out from said reactor 1 via piping 5 so that the retention level of the polymer occupies 50% volume of the reactor and then introduced into polymerization reactor 10 in the second polymerization step. A part of the propylene homopolymer was intermittently taken out from piping 5 to give a sample for measuring the isotactic pentad (P), amount of a soluble component in xylene at 20° C., intrinsic viscosity ($[\eta]_{pp}$) and yield of the polymer per unit weight of the catalyst. 5) Synthesis of propylene-ethylene copolymer (RC): second polymerization step Into a horizontal polymerization reactor equipped with stirring vanes 10 (L/D=6, inner volume: 100 liters), the propylene homopolymer from the first polymerization step and ethylene-propylene mixed gases were continuously fed to copolymerize ethylene and propylene. Reaction conditions were as follows; stirring speed: 40 rpm, temperature: 60° C. and pressure: 2.1 MPa. The gas composition in the vapor phase was controlled to give ethylene/propylene and hydrogen/ethylene molar ratios as shown in Tables 1 and 2. Carbon monoxide was supplied as a polymerization inhibitor to control the polymerized amount of the resulting propylene-ethylene copolymer and hydrogen gas was supplied to control the molecular weight of the resulting propylene-ethylene copolymer, both from piping 7.

Reaction heat was removed by evaporation of the starting liquid propylene supplied from piping 6.

Unreacted gases discharged from the polymerization reactor were cooled and condensed outside the reaction system via piping 8 and returned to the copolymerization step. The propylene composition (A) produced in the copolymerization step was taken out from polymerization reactor 10 via piping 9 so that the retention level of the polymer occupies 50% volume of the reactor.

Production rate of the propylene composition (A) was 8 to 12 kg/hr.

Monomers were removed from the propylene composition (A) taken from the reactor 10, a part was subjected to the measurement of intrinsic viscosity ($[\eta]_{WHOLE}$), Q value (Mw/Mn), amount of a soluble component in xylene at 20° C., ethylene content of the propylene-ethylene copolymers by infrared spectrum and polymerization ratio of the propylene-ethylene copolymers. The flowability of the powder of the propylene composition (A) was evaluated.

By varying the type of the titanium-containing solid catalyst component (a), Al/Si and hydrogen/propylene molar ratios in the first polymerization step, and ethylene/propylene and hydrogen/ethylene molar ratios in the second polymerization step, there were obtained samples A-1 to A-14 of the present invention and comparative samples cA-1 to cA-14.

The reaction conditions and the measured results of the physical properties are shown in Tables 1 and 2. Table 1 shows the production conditions and physical properties of the propylene compositions according to the present invention and Table 2 shows those of the comparative propylene compositions.

TABLE 1

Preparation of propylene composition

| | Example No. for the preparation of composition | | | | | | |
|---|---|---|---|---|---|---|---|
| | 1 | 2 | 3 | 4 | 5 | 6 | 7 |
| Titanium-containing solid catalyst component (a) No. | a-1 | a-1 | a-1 | a-1 | a-1 | a-2 | a-1 |
| Average particle size μm | 115 | 115 | 115 | 115 | 115 | 115 | 115 |
| Degree of uniformity | 1.74 | 1.74 | 1.74 | 1.74 | 1.74 | 1.73 | 1.74 |
| Pre-activation treatment | | | | | | | |
| Al/Ti/Si molar ratio | 2/1/0.3 | 2/1/0.3 | 2/1/0.3 | 2/1/0.3 | 2/1/0.3 | 2/1/0.3 | 2/1/0.3 |
| Olefin | PRO* | PRO | PRO | PRO | PRO | PRO | PRO |
| Reaction amount (g polymer/g catalyst) | 3 | 3 | 3 | 3 | 3 | 3 | 3 |
| First polymerization step | | | | | | | |
| Al/Si molar ratio | 3 | 6 | 2 | 3 | 3 | 3 | |
| Polymerization pressure MPa | 2.5 | 2.5 | 2.5 | 2.5 | 2.5 | 2.5 | 2.5 |
| Polymerization temperature °C | 70 | 70 | 70 | 70 | 70 | 70 | 70 |
| $H_2/C_3$ molar ratio | 0.03 | 0.06 | 0.026 | 0.003 | 0.01 | 0.04 | |
| Propylene homopolymer (PP) | | | | | | | |
| Produced amount ($W_{PP}$) wt % | 71.5 | 71.0 | 71.3 | 69.7 | 63.7 | 72.5 | 70.8 |
| Isotactic pentad (P) % | 0.963 | 0.964 | 0.973 | 0.964 | 0.967 | 0.972 | 0.968 |
| Intrinsic viscosity ($[\eta]_{PP}$) dl/g | 2.5 | 2.3 | 1.8 | 2.6 | 2.07 | 2.4 | 1.75 |
| Melt flow rate ($MFR_{PP}$) g/10 min. | 0.8 | 1.5 | 6.0 | 0.7 | 2.6 | 1.0 | 7.2 |
| Second polymerization step | | | | | | | |
| Polymerization pressure MPa | 2.1 | 2.1 | 2.1 | 2.1 | 2.1 | 2.1 | 2.1 |
| Polymerization temperature °C | 60 | 60 | 60 | 60 | 60 | 60 | 60 |
| $C_2/C_3$ molar ratio | 0.23 | 0.23 | 0.23 | 0.3 | 0.42 | 0.23 | |
| $H_2/C_2$ molar ratio | 0.18 | 0.25 | 0.57 | 0.25 | 0.32 | 0.2 | |
| PP-ET copolymer (RC) | | | | | | | |
| Produced amount ($W_{RC}$) wt % | 28.5 | 29.0 | 28.7 | 30.3 | 36.3 | 27.5 | 29.2 |
| Ethylene content wt % | 35 | 35 | 35 | 41 | 48 | 35 | 34 |
| Intrinsic viscosity ($[\eta]_{RC}$) dl/g | 2.5 | 2.3 | 1.8 | 2.4 | 2.17 | 2.4 | 1.9 |
| Melt flow rate ($MFR_{RC}$) g/10 min. | 0.8 | 1.5 | 6.0 | 1.5 | 2.3 | 1.0 | 4.1 |
| Xylene-soluble component ($CXS_{RC}$) wt % | 94 | 94 | 95 | 90 | 86 | 94 | 86 |
| Propylene composition (A) No. | A-1 | A-2 | A-3 | A-4 | A-5 | A-6 | A-7 |
| PP/RC weight ratio ($W_{PP}/W_{RC}$) | 2.51 | 2.45 | 2.48 | 2.3 | 1.75 | 2.46 | 2.42 |
| Intrinsic viscosity ($[\eta]_{WHOLE}$) dl/g | 2.5 | 2.3 | 1.8 | 2.3 | 2.09 | 2.4 | 1.8 |
| Intrinsic viscosity ratio ($[\eta]_{RC}/[\eta]_{PP}$) | 1.0 | 1.0 | 1.0 | 0.92 | 1.05 | 1.0 | 1.09 |
| ($[\eta]_{RC}/[\eta]_{PP}$) × ($W_{PP}/W_{RC}$) | 2.51 | 2.45 | 2.48 | 2.1 | 1.83 | 2.46 | 2.63 |
| Melt flow rate ($MFR_{WHOLE}$) g/10 min. | 0.8 | 1.5 | 6.0 | 1.4 | 2.5 | 1.0 | 6.0 |
| Molecular weight dispersion Q value (Mw/Mn) | 3.7 | 3.8 | 4.0 | 3.8 | 4.3 | 3.9 | 4.2 |
| Powder flowability | | | | | | | |
| Loose density g/ml | 0.36 | 0.36 | 0.36 | 0.36 | 0.34 | 0.42 | |
| Compact density g/ml | 0.36 | 0.36 | 0.36 | 0.36 | 0.35 | 0.43 | |
| Powder compressibility % | 0 | 0 | 0 | 0 | 2.9 | 2.3 | |

| | Example No. for the preparation of composition | | | | | | |
|---|---|---|---|---|---|---|---|
| | 8 | 9 | 10 | 11 | 12 | 13 | 14 |
| Titanium-containing solid catalyst component (a) No. | a-1 | a-1 | a-1 | a-1 | a-1 | a-2 | a-1 |
| Average particle size μm | 115 | 115 | 115 | 115 | 115 | 115 | 115 |
| Degree of uniformity | 1.74 | 1.74 | 1.74 | 1.74 | 1.74 | 1.74 | 1.74 |
| Pre-activation treatment | | | | | | | |
| Al/Ti/Si molar ratio | 2/1/0.3 | 2/1/0.3 | 2/1/0.3 | 2/1/0.3 | 2/1/0.3 | 2/1/0.3 | 2/1/0.3 |
| Olefin | PRO* | PRO | PRO | PRO | PRO | PRO | PRO |
| Reaction amount (g polymer/g catalyst) | 3 | 3 | 3 | 3 | 3 | 3 | 3 |
| First polymerization step | | | | | | | |
| Al/Si molar ratio | | | | | | | |
| Polymerization pressure MPa | 2.5 | 2.5 | 2.5 | 2.5 | 2.5 | 2.5 | 2.5 |
| Polymerization temperature °C | 70 | 70 | 70 | 70 | 70 | 70 | 70 |
| $H_2/C_3$ molar ratio | | | | | | | |
| Propylene homopolymer (PP) | | | | | | | |
| Produced amount ($W_{PP}$) wt % | 70.3 | 71.1 | 75.0 | 62.2 | 69.7 | 68.9 | 72.3 |

TABLE 1-continued

Preparation of propylene composition

| | | | | | | | |
|---|---|---|---|---|---|---|---|
| Isotactic pentad (P) % | 0.969 | 0.970 | 0.971 | 0.967 | 0.970 | 0.969 | 0.955 |
| Intrinsic viscosity ($[\eta]_{PP}$) dl/g | 1.8 | 2.05 | 1.8 | 1.8 | 1.8 | 1.8 | 1.8 |
| Melt flow rate ($MFR_{PP}$) g/10 min. | 6.1 | 2.8 | 6.2 | 6.5 | 6.2 | 6.0 | 6.1 |
| Second polymerization step | | | | | | | |
| Polymerization pressure MPa | 2.1 | 2.1 | 2.1 | 2.1 | 2.1 | 2.1 | 2.1 |
| Polymerization temperature ° C. | 60 | 60 | 60 | 60 | 60 | 60 | 60 |
| $C_2/C_3$ molar ratio | | | | | | | |
| $H_2/C_2$ molar ratio | | | | | | | |
| PP-ET copolymer (RC) | | | | | | | |
| Produced amount ($W_{RC}$) wt % | 29.7 | 28.9 | 25.0 | 37.8 | 30.3 | 31.1 | 27.7 |
| Ethylene content wt % | 35 | 35 | 36 | 33 | 28 | 41 | 36 |
| Intrinsic viscosity ($[\eta]_{RC}$) dl/g | 1.8 | 1.6 | 1.8 | 1.8 | 1.8 | 1.8 | 1.8 |
| Melt flow rate ($MFR_{RC}$) g/10 min. | 6.0 | 10.6 | 6.1 | 6.5 | 6.0 | 6.1 | 6.2 |
| Xylene-soluble component ($CXS_{RC}$) wt % | 89 | 90 | 87 | 88 | 92 | 86 | 87 |
| Propylene composition (A) No. | A-8 | A-9 | A-10 | A-11 | A-12 | A-13 | A-14 |
| PP/RC weight ratio ($W_{PP}/W_{RC}$) | 2.37 | 2.46 | 3.00 | 1.65 | 2.30 | 2.22 | 2.61 |
| Intrinsic viscosity ($[\eta]_{WHOLE}$) dl/g | 1.8 | 1.93 | 1.8 | 1.8 | 1.8 | 1.8 | 1.8 |
| Intrinsic viscosity ratio ($[\eta]_{RC}/[\eta]_{PP}$) | 1.00 | 0.78 | 1.00 | 1.00 | 1.00 | 1.00 | 1.00 |
| ($[\eta]_{RC}/[\eta]_{PP}$) × ($W_{PP}/W_{RC}$) | 2.37 | 1.92 | 3.00 | 1.65 | 2.30 | 2.22 | 2.61 |
| Melt flow rate ($MFR_{WHOLE}$) g/10 min. | 6.1 | 4.0 | 6.2 | 6.5 | 6.2 | 6.0 | 6.1 |
| Molecular weight dispersion Q value (Mw/Mn) | 4.2 | 4.2 | 4.2 | 4.2 | 4.2 | 4.2 | 4.2 |
| Powder flowability | | | | | | | |
| Loose density g/ml | | | | | | | |
| Compact density g/ml | | | | | | | |
| Powder compressibility % | | | | | | | |

*PRO = Propylene

TABLE 2

Preparation of comparative propylene composition

| | Comparative Example No. for the preparation of composition | | | | | | |
|---|---|---|---|---|---|---|---|
| | 1 | 2 | 3 | 4 | 5 | 6 | 7 |
| Titanium-containing solid catalyst component (a) No. | a-1 | a-1 | a-2 | a-3 | a-1 | a-1 | a-1 |
| Average particle size μm | 115 | 115 | 115 | 18.5 | 115 | 115 | 115 |
| Degree of uniformity | 1.74 | 1.74 | 1.74 | 2.07 | 1.74 | 1.74 | 1.74 |
| Pre-activation treatment | | | | | | | |
| Al/Ti/Si molar ratio | 2/1/0.3 | 2/1/0.3 | 2/1/0.3 | 2/1/0.3 | 2/1/0.3 | 2/1/0.3 | 2/1/0.3 |
| Olefin | PRO* | PRO | PRO | PRO | PRO | PRO | PRO |
| Reaction amount (g polymer/g catalyst) | 3 | 3 | 3 | 3 | 3 | 3 | 3 |
| First polymerization step | | | | | | | |
| Al/Si molar ratio | 14 | 3 | 3 | 3 | 3 | 3 | 3 |
| Polymerization pressure MPa | 2.5 | 2.5 | 2.5 | 2.5 | 2.5 | 2.5 | 2.5 |
| Polymerization temperature ° C. | 70 | 70 | 70 | 70 | 70 | 70 | 70 |
| $H_2/C_3$ molar ratio | 0.007 | 0.055 | 0.006 | 0.003 | 0.022 | 0.055 | 0.003 |
| Propylene homopolymer (PP) | | | | | | | |
| Produced amount ($W_{PP}$) wt % | 80.5 | 80.5 | 86.8 | 69.7 | 75.6 | 75.3 | 46.3 |
| Isotactic pentad (P) % | 0.949 | 0.972 | 0.964 | 0.971 | 0.971 | 0.974 | 0.962 |
| Intrinsic viscosity ($[\eta]_{PP}$) dl/g | 2.3 | 1.6 | 2.3 | 2.6 | 1.84 | 1.52 | 2.5 |
| Melt flow rate ($MFR_{PP}$) g/10 min. | 2.1 | 14.5 | 1.4 | 0.7 | 5.3 | 16.8 | 0.8 |
| Second polymerization step | | | | | | | |
| Polymerization pressure MPa | 2.1 | 2.1 | 2.1 | 2.1 | 2.1 | 2.1 | 2.1 |
| Polymerization temperature ° C. | 60 | 60 | 60 | 60 | 60 | 60 | 60 |
| $C_2/C_3$ molar ratio | 0.35 | 0.36 | 0.3 | 0.28 | 0.36 | 0.43 | 0.23 |
| $H_2/C_2$ molar ratio | 0.3 | 0.12 | 0.25 | 0.25 | 0.10 | 0.02 | 0.15 |
| PP-ET copolymer (RC) | | | | | | | |
| Produced amount (WRC) wt % | 19.5 | 19.5 | 13.2 | 30.3 | 24.4 | 24.7 | 53.7 |
| Ethylene content wt % | 45 | 45 | 41 | 41 | 46 | 49 | 35 |
| Intrinsic viscosity ($[\eta]_{RC}$) dl/g | 2.0 | 2.9 | 2.3 | 2.4 | 3.0 | 4.9 | 2.6 |
| Melt flow rate ($MFR_{RC}$) g/10 min. | 3.4 | 0.4 | 1.4 | 1.5 | 0.3 | 0.02 | 0.6 |

TABLE 2-continued

| Preparation of comparative propylene composition | | | | | | | |
|---|---|---|---|---|---|---|---|
| Xylene-soluble component (CXS$_{RC}$) wt % | 88 | 88 | 90 | 90 | 85 | 84 | 93 |
| Propylene composition (A) No. | cA-1 | cA-2 | cA-3 | cA-4 | cA-5 | cA-6 | cA-7 |
| PP/RC weight ratio (W$_{PP}$/W$_{RC}$) | 4.13 | 4.13 | 6.57 | 2.3 | 3.1 | 3.1 | 0.86 |
| Intrinsic viscosity ([η]$_{WHOLE}$) dl/g | 2.1 | 1.9 | 2.3 | 2.3 | 2.1 | 2.0 | 2.6 |
| Intrinsic viscosity ratio ([η]$_{RC}$/[η]$_{PP}$) | 0.87 | 2.1 | 1.0 | 0.92 | 1.6 | 3.2 | 1.0 |
| ([η]$_{RC}$/[η]$_{PP}$) × (W$_{PP}$/W$_{RC}$) | 3.59 | 7.7 | 6.57 | 2.14 | 5.0 | 9.7 | 0.86 |
| Melt flow rate (MFR$_{WHOLE}$) g/10 min. | 2.3 | 7.0 | 1.4 | 1.4 | 2.7 | 3.0 | 0.7 |
| Molecular weight dispersion Q value (Mw/Mn) | 4.4 | 6.7 | 3.8 | 3.8 | 5.1 | 8.2 | 4.5 |
| Powder flowability | | | | | | | |
| Loose density g/ml | 0.35 | 0.36 | 0.36 | 0.46 | 0.36 | 0.36 | 0.34 |
| Compact density g/ml | 0.34 | 0.36 | 0.36 | 0.37 | 0.36 | 0.36 | 0.36 |
| Powder compressibility % | 2.9 | 0 | 0 | 19.6 | 0 | 0 | 5.6 |

| | Comparative Example No. for the preparation of composition | | | | | | |
|---|---|---|---|---|---|---|---|
| | 8 | 9 | 10 | 11 | 12 | 13 | 14 |
| Titanium-containing solid catalyst component (a) No. | a-1 | a-1 | a-1 | a-1 | a-1 | a-1 | a-1 |
| Average particle size μm | 115 | 115 | 115 | 115 | 115 | 115 | 115 |
| Degree of uniformity | 1.74 | 1.74 | 1.74 | 1.74 | 1.74 | 1.74 | 1.74 |
| Pre-activation treatment | | | | | | | |
| Al/Ti/Si molar ratio | 2/1/0.3 | 2/1/0.3 | 2/1/0.3 | 2/1/0.3 | 2/1/0.3 | 2/1/0.3 | 2/1/0.3 |
| Olefin | PRO* | PRO | PRO | PRO | PRO | PRO | PRO |
| Reaction amount (g polymer/g catalyst) | 3 | 3 | 3 | 3 | 3 | 3 | 3 |
| First polymerization step | | | | | | | |
| Al/Si molar ratio | | | | | | | |
| Polymerization pressure MPa | 2.5 | 2.5 | 2.5 | 2.5 | 2.5 | 2.5 | 2.5 |
| Polymerization temperature ° C. | 70 | 70 | 70 | 70 | 70 | 70 | 70 |
| H$_2$/C$_3$ molar ratio | | | | | | | |
| Propylene homopolymer (PP) | | | | | | | |
| Produced amount (W$_{PP}$) wt % | 70.8 | 69.5 | 82.4 | 56.1 | 70.3 | 68.8 | 70.4 |
| Isotactic pentad (P) % | 0.971 | 0.968 | 0.968 | 0.966 | 0.971 | 0.969 | 0.941 |
| Intrinsic viscosity ([η]$_{PP}$) dl/g | 1.4 | 2.3 | 1.8 | 1.8 | 1.8 | 1.8 | 1.8 |
| Melt flow rate (MFR$_{PP}$) g/10 min. | 34.0 | 1.5 | 6.2 | 6.1 | 6.2 | 6.1 | 6.0 |
| Second polymerization step | | | | | | | |
| Polymerization pressure MPa | 2.1 | 2.1 | 2.1 | 2.1 | 2.1 | 2.1 | 2.1 |
| Polymerization temperature ° C. | 60 | 60 | 60 | 60 | 60 | 60 | 60 |
| C$_2$/C$_3$ molar ratio | | | | | | | |
| H$_2$/C$_2$ molar ratio | | | | | | | |
| PP-ET copolymer (RC) | | | | | | | |
| Produced amount (W$_{RC}$) wt % | 29.2 | 30.5 | 17.7 | 43.9 | 29.7 | 31.2 | 29.6 |
| Ethylene content wt % | 36 | 36 | 34 | 35 | 21 | 64 | 35 |
| Intrinsic viscosity ([η]$_{RC}$) dl/g | 2.8 | 1.4 | 1.8 | 1.8 | 1.8 | 1.8 | 1.8 |
| Melt flow rate (MFR$_{RC}$) g/10 min. | 0.41 | 27.3 | 5.9 | 6.1 | 5.9 | 6.0 | 6.0 |
| Xylene-soluble component (CXS$_{RC}$) wt % | 85 | 89 | 90 | 87 | 86 | 83 | 89 |
| Propylene composition (A) No. | cA-8 | cA-9 | cA-10 | cA-11 | cA-12 | cA-13 | cA-14 |
| PP/RC weight ratio (W$_{PP}$/W$_{RC}$) | 2.42 | 2.28 | 4.66 | 1.28 | 2.37 | 2.21 | 2.38 |
| Intrinsic viscosity ([η]$_{WHOLE}$) dl/g | 1.79 | 2.0 | 1.8 | 1.8 | 1.8 | 1.8 | 1.8 |
| Intrinsic viscosity ratio ([η]$_{RC}$/[η]$_{PP}$) | 2.00 | 0.61 | 1.0 | 1.0 | 1.0 | 1.0 | 1.0 |
| ([η]$_{RC}$/[η]$_{PP}$) × (W$_{PP}$/W$_{RC}$) | 4.84 | 1.39 | 4.66 | 1.28 | 2.37 | 2.21 | 2.38 |
| Melt flow rate (MFR$_{WHOLE}$) g/10 min. | 6.2 | 3.0 | 6.2 | 6.1 | 6.2 | 6.1 | 6.0 |
| Molecular weight dispersion Q value (Mw/Mn) | 6.2 | 5.5 | 4.2 | 4.3 | 4.3 | 4.4 | 4.3 |
| Powder flowability | | | | | | | |
| Loose density g/ml | | | | | | | |
| Cotnpact density g/ml | | | | | | | |
| Powder compressibility % | | | | | | | |

*PRO = Propylene

B. Polypropylene Compositions (Ci) for Injection Molding and Injection Molded Articles

1) Polypropylene Compositions

Each of the powders of the propylene compositions A-1 to A-6 according to the present invention and the comparative compositions cA-1 to cA-7 was incorporated with various additives and mixed at room temperature for 5 to 10 minutes using a high speed stirring mixer (Henschel mixer), and each of the mixtures was pelletized into pellets by an extruding pelletizer with a screw diameter of 40 mm while setting the cylinder temperature at 230° C.

Tables 3 and 4 show the additive components and the amounts thereof for the injection molding polypropylene compositions Ci-1 to Ci-12 and Ci-13 to Ci-18 of the present invention, and Tables 5 and 6 show those of comparative compositions cCi-1 to cCi-7 and cCi-13.

The additive components and abbreviations appearing in the tables are shown below.

Propylene Homopolymer

PHP 1: a crystalline propylene homopolymer having a melt flow rate $MFR_{PHP}$ of 1 and a melting point of 163° C., which was produced by homopolymerization of propylene using titanium-containing solid catalyst-component a-1 under the following conditions; Al/Si molar ratio: 2, hydrogen/propylene molar ratio: 0.03, polymerization pressure: 2.5 MPa and polymerization temperature: 70° C.

PHP 2: a crystalline propylene homopolymer having a melt flow rate $MFR_{PHP}$ of 1.9 and a melting point of 164° C., which was produced by homopolymerization of propylene using titanium-containing solid catalyst component a-1 under the following conditions; Al/Si molar ratio: 2, hydrogen/propylene molar ratio: 0.01, polymerization pressure: 2.5 MPa, and polymerization temperature: 70° C.

PHP 3: a comparative crystalline propylene homopolymer having a melt flow rate $MFR_{PHP}$, of 6 and a melting point of 164° C., which was produced by homopolymerization of propylene using titanium-containing solid catalyst component a-1 under the following conditions; Al/Si molar ratio: 2, hydrogen/propylene molar ratio : 0.055, polymerization pressure: 2.5 MPa, and polymerization temperature: 70° C.

Antioxidants

Ph-1: phenolic thermal stabilizer

Ph-2: tetrakis(methylene-3-(3',5'-di-t-butyl-4'-hydroxyphenyl)propionate)methane α-crystal nucleating agents α-1: aluminum hydroxy-bis(4-t-butylbenzoate)

α-2: 1.3,2.4-bis(p-methylbenzylidene)sorbitol

α-3: sodium 2,2'-methylene-bis(4,6-di-t-butylphenyl) phosphate

Radical generator: 1,3-bis(t-butyl-peroxyisopropyl)benzene

Neutralizer: calcium stearate

TABLE 3

Composition for injection molding and injection molded article (I)

| | Example No. for injection molding | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polypropylene composition (Ci) No. | Ci-1 | Ci-2 | Ci-3 | Ci-4 | Ci-5 | Ci-6 | Ci-7 | Ci-8 | Ci-9 | Ci-10 | Ci-11 | Ci-12 |
| Propylene composition (A) No. | A-1 | A-2 | A-3 | A-4 | A-5 | A-6 | A-1 | A-1 | A-1 | A-5 | A-5 | A-5 |
| part by weight | 100 | 100 | 100 | 100 | 100 | 100 | 100 | 100 | 100 | 100 | 100 | 100 |
| Propylene homopolymer | | | | | | | | | | | | |
| type | — | — | — | — | — | — | — | — | — | — | — | — |
| part by weight | — | — | — | — | — | — | — | — | — | — | — | — |
| α-crystal nucleating agent | | | | | | | | | | | | |
| type | — | — | — | — | — | — | α-1 | α-2 | α-3 | α-1 | α-2 | α-3 |
| part by weight | — | — | — | — | — | — | 0.15 | 0.3 | 0.2 | 0.15 | 0.3 | 0.2 |
| Radical generator part by weight | — | — | — | — | — | — | — | — | — | — | — | — |
| Antioxidant | | | | | | | | | | | | |
| type | Ph-1 | Ph-1 | Ph-1 | Ph-1 | Ph-1 | Ph-1 | Ph-2 | P-2 | Ph-2 | Ph-2 | Ph-2 | Ph-2 |
| part by weight | 0.1 | 0.1 | 0.1 | 0.1 | 0.1 | 0.1 | 0.1 | 0.1 | 0.1 | 0.1 | 0.1 | 0.1 |
| Neutralizer, calcium stearate part by weight | 0.1 | 0.1 | 0.1 | 0.1 | 0.1 | 0.1 | 0.1 | 0.1 | 0.1 | 0.1 | 0.1 | 0.1 |
| Physical properties | | | | | | | | | | | | |
| Molding shrinkage % | 0.96 | 0.98 | 0.99 | 0.99 | 0.75 | 0.99 | 1.0 | 1.1 | 1.1 | 0.85 | 0.85 | 0.87 |
| Flexural modulus MPa | 670 | 680 | 720 | 700 | 590 | 680 | 810 | 720 | 740 | 740 | 690 | 700 |
| Impact resistance | | | | | | | | | | | | |
| (−20° C.) J/m | 120 | 110 | 60 | NB | NB | 110 | — | — | — | — | — | — |
| (23° C.) J/m | — | — | — | — | — | — | — | — | — | — | — | — |
| Izod impact strength (−30° C.) J/m | — | — | — | — | — | — | 103 | 455 | 200 | NB | NB | NB |
| Haze % | 48 | 45 | 44 | 55 | 57 | 50 | 41 | 34 | 37 | 57 | 55 | 55 |
| Gloss % | 84 | 84 | 87 | 83 | 83 | 86 | 87 | 89 | 87 | 85 | 85 | 86 |
| Stress-whitening resistance | ○ | ○ | ○ | Δ | Δ | ○ | — | — | — | — | — | — |

TABLE 4

Composition for injection molding and injection molded article (II)

| | Example No. for injection molding | | | | | |
|---|---|---|---|---|---|---|
| | 13 | 14 | 15 | 16 | 17 | 18 |
| Polypropylene composition (Ci) No. | Ci-13 | Ci-14 | Ci-15 | Ci-16 | Ci-17 | Ci-18 |
| Propylene composition (A) No. | A-1 | A-1 | A-1 | A-5 | A-5 | A-5 |
| part by weight | 100 | 50 | 50 | 100 | 50 | 50 |
| Propylene homopolymer | | | | | | |
| type | — | PHP-1 | PHP-1 | — | PHP-2 | PHP-2 |
| part by weight | — | 50 | 50 | — | 50 | 50 |
| α-crystal nucleating agent | | | | | | |
| type | — | — | — | — | — | — |
| part by weight | — | — | — | — | — | — |
| Radical generator part by weight | 0.02 | — | 0.02 | 0.01 | — | 0.01 |
| Antioxidant | | | | | | |
| type | Ph-1 | Ph-1 | Ph-1 | Ph-1 | Ph-1 | Ph-1 |
| part by weight | 0.02 | 0.02 | 0.02 | 0.02 | 0.02 | 0.02 |
| Neutralizer, calcium stearate part by weight | 0.02 | 0.02 | 0.02 | 0.02 | 0.02 | 0.02 |
| Physical properties | | | | | | |
| Melt flow rate (MFR) g/10 min. | 10 | 1 | 11 | 12 | 2.3 | 14 |
| Molding shrinkage % | 0.96 | 1.23 | 1.2 | 0.75 | 1.12 | 1.1 |
| Flexural modulus MPa | 670 | 850 | 825 | 590 | 820 | 810 |
| Impact resistance | | | | | | |
| (−20° C.) J/m | — | — | — | — | — | — |
| (23° C.) J/m | NB | 90 | 70 | NB | 100 | 70 |
| Izod impact strength (−30° C.) J/m | — | — | — | — | — | — |
| Haze % | 48 | 60 | 59 | 57 | 63 | 65 |
| Gloss % | 84 | 87 | 87 | 83 | 86 | 85 |
| Stress-whitening resistance | ○ | ○ | ○ | ○ | ○ | ○ |

TABLE 5

Comparative composition for injection molding and injection molded article (I)

| | Comparative Example No. for injection molding | | | | | | |
|---|---|---|---|---|---|---|---|
| | 1 | 2 | 3 | 4 | 5 | 6 | 7 |
| Polypropylene composition (Ci) No. | cCi-1 | cCi-2 | cCi-3 | cCi-4 | cCi-5 | cCi-6 | cCi-7 |
| Propylene composition (A) No. | cA-1 | cA-2 | cA-3 | cA-4 | cA-5 | cA-6 | cA-7 |
| part by weight | 100 | 100 | 100 | 100 | 100 | 100 | 100 |
| Propylene homopolymer | | | | | | | |
| type | — | — | — | — | — | — | — |
| part by weight | — | — | — | — | — | — | — |
| α-crystal nucleating agent | | | | | | | |
| type | — | — | — | — | — | — | — |
| part by weight | — | — | — | — | — | — | — |
| Radical generator part by weight | — | — | — | — | — | — | — |
| Antioxidant | | | | | | | |
| type | Ph-1 | Ph-1 | Ph-1 | Ph-1 | Ph-1 | Ph-1 | Ph-1 |
| part by weight | 0.1 | 0.1 | 0.1 | 0.1 | 0.1 | 0.1 | 0.1 |
| Neutralizer, calcium stearate part by weight | 0.1 | 0.1 | 0.1 | 0.1 | 0.1 | 0.1 | 0.1 |
| Physical properties of molded article | | | | | | | |
| Molding shrinkage % | 1.08 | 1.42 | 1.41 | 0.98 | 1.38 | 1.56 | 0.62 |
| Flexural modulus MPa | 800 | 900 | 1100 | 710 | 750 | 770 | 370 |
| Impact resistance | | | | | | | |
| (−20° C.) J/m | 70 | 70 | 45 | 400 | 120 | 140 | NB |
| (23° C.) J/m | — | — | — | — | — | — | — |
| Izod impact strength (−30° C.) J/m | — | — | — | — | — | — | — |
| Haze % | 50 | 75 | 65 | 57 | 66 | 58 | 53 |

TABLE 5-continued

Comparative composition for injection molding and injection molded article (I)

| | Comparative Example No. for injection molding | | | | | | |
|---|---|---|---|---|---|---|---|
| | 1 | 2 | 3 | 4 | 5 | 6 | 7 |
| Gloss % | 88 | 96 | 90 | 85 | 93 | 96 | 77 |
| Stress-whitening resistance | Δ | x | ○ | Δ | x | x | ○ |

TABLE 6

Comparative composition for injection molding and injection molded article (II)

| | Comparative Example No. for injection molding | | | | | |
|---|---|---|---|---|---|---|
| | 8 | 9 | 10 | 11 | 12 | 13 |
| Polypropylene composition (Ci) No. | cCi-8 | cCi-9 | cCi-10 | cCi-11 | cCi-12 | cCi-13 |
| Propylene composition (A) No. | cA-2 | cA-2 | cA-2 | cA-2 | cA-2 | cA-2 |
| part by weight | 100 | 100 | 100 | 100 | 50 | 50 |
| Propylene homopolymer | | | | | | |
| type | — | — | — | — | PHP-3 | PHP-3 |
| part by weight | — | — | — | — | 50 | 50 |
| α-crystal nucleating agent | | | | | | |
| type | α-1 | α-2 | α-3 | — | — | — |
| part by weight | 0.15 | 0.3 | 0.2 | — | — | — |
| Radical generator part by weight | — | — | — | 0.005 | — | 0.005 |
| Antioxidant | | | | | | |
| type | Ph-2 | Ph-2 | Ph-2 | Ph-1 | Ph-1 | Ph-1 |
| part by weight | 0.1 | 0.1 | 0.1 | 0.02 | 0.02 | 0.02 |
| Neutralizer, calcium stearate | 0.1 | 0.1 | 0.1 | 0.02 | 0.02 | 0.02 |
| part by weight | | | | | | |
| Physical properties | | | | | | |
| Melt flow rate (MFR) g/10 min. | — | — | — | 30 | 7 | 35 |
| Molding shrinkage % | 1.4 | 1.4 | 1.5 | 1.42 | 1.46 | 1.45 |
| Flexural modulus MPa | 1150 | 1070 | 1100 | 900 | 1000 | 1050 |
| Impact resistance | | | | | | |
| (−20° C.) J/m | — | — | — | — | — | — |
| (23° C.) J/m | — | — | — | 120 | 80 | 50 |
| Izod impact strength (−30° C.) J/m | 101 | 101 | 98 | — | — | — |
| Haze % | 91 | 91 | 91 | 96 | 70 | 70 |
| Gloss % | 66 | 60 | 63 | 75 | 77 | 78 |
| Stress-whitening resistance | — | — | — | x | x | x |

2) Injection Molding

Each of the pellets as prepared above was molded into a JIS type test piece and a test piece for measuring physical properties, using an injection molding machine in which the molten resin temperature was set at 230° C. and the mold temperature at 50° C.

The test pieces were conditioned in a chamber kept at a humidity of 50% and at room temperature 23° C. for 72 hours, and measured for the physical properties according to the following methods:

a) Molding shrinkage: 100 times of the ratio of the length obtained by subtracting the whole length of the tensile test piece (JIS K 7113 No. 1 tensile test piece) from the whole length of the mold of the molding machine to the whole length of the mold, which is calculated from the following equation:

$$\text{Molding shrinkage} = \frac{\left(\begin{array}{c}\text{Whole length of} - \text{Whole length of}\\\text{the mold} \quad \text{the test piece}\end{array}\right) \times 100}{\text{Whole length of the mold}}$$

b) Flexural modulus (MPa): Measured according to JIS K 7203.

c) Impact resistance (J/m): Measured at −20° C. or 23° C. according to JIS K 7110.

d) Izod impact strength (J/m): Measured at −30° C. according to JIS K 7110.

e) Haze: Measured on a plate-like 25×50×1 mm test piece according to ASTM D 1003.

f) Gloss: Measured at an indication angle of 60 degrees according to ASTM D 523 specular gloss method.

g) Stress-whitening resistance: Using a test piece having a hinge structure, a degree of whitening on folding at the hinge portion was visually observed and evaluated according to the following three standards:

○: color at the hinge portion is equivalent to that at the other portions.

Δ: color at the hinge portion is slightly whiter than that at the other portions.

X: color at the hinge portion is remarkably whiter than that at the other portions.

The measured results are shown in Tables 3 to 6. "NB" in the impact test data means that the test piece did not break under the given conditions.

Regarding the inventive samples Ci-1 to Ci-6 and the comparative samples cCi-1 to cCi-6, FIG. 1 shows the relation between a product of the intrinsic viscosity ratio and the weight ratio of the propylene homopolymer to the propylene-ethylene copolymer and the molding shrinkage and FIG. 2 the relation between said product and bending modulus.

C. Preparation of Sheet Molding Polypropylene Composition (Cs) and Sheet

1) Polypropylene Composition

Each of the powders of the propylene compositions A-1 to A-6 of the present invention and comparative compositions cA-1, -3, -5 and -7 was incorporated with various additives and mixed at room temperature for 5 to 10 minutes using a high speed mixer (Henschel mixer), and each of the mixtures was granulated into pellets by an extruding granulator with a screw diameter of 40 mm while setting the cylinder temperature at 230° C.

Tables 7 and 8 show the additive components and the amounts added to the polypropylene compositions Cs-1 to Cs-6 of the present invention and the comparative compositions cCs-1 to cCs-4.

The additive components and abbreviations thereof appearing in the tables are indicated below.

Antioxidant

P-1: phosphorus thermal stabilizer

P-2: tris(2,4-di-t-butylphenyl)phosphite

Neutralizer: the same as the above.

TABLE 8

Comparative composition for sheet molding and sheet

|  | Comparative Example No. for sheet molding | | | |
|---|---|---|---|---|
|  | 1 | 2 | 3 | 4 |
| Polypropylene composition (Cs) No. | cCs-1 | cCs-2 | cCs-3 | cCs-4 |
| Propylene composition (A) No. | cA-1 | cA-5 | cA-3 | cA-7 |
| part by weight | 100 | 100 | 100 | 100 |
| Antioxidant |  |  |  |  |
| type | P-2 | P-2 | P-2 | P-2 |
| part by weight | 0.1 | 0.1 | 0.1 | 0.1 |
| Neutralizer, calcium stearate | 0.1 | 0.1 | 0.1 | 0.1 |
| part by weight |  |  |  |  |
| Molding conditions |  |  |  |  |
| Resin temperature ° C. | 230 | 230 | 230 | 230 |
| Cooling roll temperature ° C. | 60 | 60 | 60 | 60 |
| Line speed m/min. | 5 | 5 | 5 | 5 |
| Physical properties of sheet |  |  |  |  |
| Tensile strength at yield point (50° C.) MPa | 18.6 | 17.3 | 22.2 | 12.1 |
| Young's modulus (23° C.) MPa | 510 | 480 | 617 | 208 |
| Punching impact resistance (0° C.) J | ≧3 | ≧3 | — | — |
| Whitening on folding mmφ | 15 | 20 | — | — |
| Printability | ○ | ○ | ○ | x |

2) Sheet Molding

Each of the compositions as prepared above was molded into a sheet of 5 mm thick by a sheet molding machine equipped with a T-die and a polishing roll at the cylinder temperature, cooling roll temperature and line speed as shown in Tables 9 and 10.

The molded sheet was conditioned in a chamber at a humidity of 50% and room temperature 23° C. for 72 hours, and measured for the following physical properties. Molding conditions and the measured results of the physical properties are shown in Tables 7 and 8.

TABLE 7

Composition for sheet molding and sheet

|  | Example No. for sheet molding | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Polypropylene composition (Cs) No. | Cs-1 | Cs-1 | Cs-1 | Cs-1 | Cs-1 | Cs-1 | Cs-1 | Cs-2 | Cs-3 | Cs-4 | Cs-5 | Cs-6 |
| Propylene composition (A) No. | A-2 | A-2 | A-2 | A-2 | A-2 | A-2 | A-2 | A-5 | A-1 | A-3 | A-4 | A-6 |
| part by weight | 100 | 100 | 100 | 100 | 100 | 100 | 100 | 100 | 100 | 100 | 100 | 100 |
| Antioxidant |  |  |  |  |  |  |  |  |  |  |  |  |
| type | P-2 | P-1 | P-1 | P-1 | P-1 | P-1 | P-1 | P-2 | P-2 | P-2 | P-2 | P-2 |
| part by weight | 0.1 | 0.1 | 0.1 | 0.1 | 0.1 | 0.1 | 0.1 | 0.1 | 0.1 | 0.1 | 0.1 | 0.1 |
| Neutralizer, calcium stearate | 0.1 | 0.1 | 0.1 | 0.1 | 0.1 | 0.1 | 0.1 | 0.1 | 0.1 | 0.1 | 0.1 | 0.1 |
| part by weight |  |  |  |  |  |  |  |  |  |  |  |  |
| Molding conditions |  |  |  |  |  |  |  |  |  |  |  |  |
| Resin temperature ° C. | 230 | 230 | 230 | 230 | 230 | 190 | 270 | 230 | 230 | 230 | 230 | 230 |
| Cooling roll temperature ° C. | 60 | 20 | 80 | 60 | 60 | 60 | 60 | 60 | 60 | 60 | 60 | 60 |
| Line speed m/min. | 5 | 5 | 5 | 0.5 | 40 | 5 | 5 | 5 | 5 | 5 | 5 | 5 |
| Physical properties of sheet |  |  |  |  |  |  |  |  |  |  |  |  |
| Tensile strength at yield point (50° C.) MPa | 15.4 | — | — | — | — | — | — | 15.6 | 18.7 | 15.5 | 15.2 | 18.7 |
| Young's modulus (23° C.) MPa | 382 | — | — | — | — | — | — | 331 | 376 | 404 | 393 | 382 |
| Punching impact resistance (0° C.) J | ≧3 | ≧3 | ≧3 | ≧3 | ≧3 | ≧3 | ≧3 | ≧3 | — | — | — | — |
| Whitening on folding mmφ | ≦3 | ≦3 | ≦3 | ≦3 | ≦3 | ≦3 | ≦3 | ≦3 | — | — | — | — |
| Printability | ○ | — | — | — | — | — | — | ○ | ○ | ○ | ○ | ○ | a) Tensile strength at yield point (MPa): Measured according to ASTM D 882 after allowing to stand in a constant temperature bath at 50° C. for 30 minutes or more.
b) Young's modulus (MPa): Measured according to ASTM D 882 after allowing to stand in a chamber at 23° C. for 48 hours or more.
c) Punching impact strength (J): Measured according to ASTM D 781.
d) Whitening on folding (mmφ): A sheet of 10 mm in width and 120 mm in length was used as a punching test piece. The both ends of the test piece were gradually allowed to come near to each other to fold the piece and the curvature of the curved portion at the time where a whitening generated thereon was measured. A diameter of the circle corresponding to this curvature was calculated to evaluate a whitening on folding, which was used as an indication of stress-whitening resistance.
e) Printing property: Using a gravure printing machine, three color-printing was carried out at a drying temperature of 50° C. and a printing speed of 5 m/min., and printing shear was visually observed.

◯: no shear in printing

X: apparent shear in printing

Molding conditions and the measured results of the physical properties are shown in Tables 7 and 8.

D. Preparation of Polypropylene Composition for Film (Cf) and its Films

1) Polypropylene Composition

Each of the propylene compositions A-7 to 14, -2, -4 and -5 of the present invention and the comparative propylene compositions cA-8 to 14, -5 and -6 was incorporated with various additives and mixed using Henshel mixer (trade name), and the mixture was molten kneaded and granulated into pellets by a single screw extruder (bore diameter: 40 mmφ) to obtain polypropylene compositions Cf-1 to Cf-12 for film and comparative compositions cCf-1 to cCf-9 for film.

The polypropylene compositions and the comparative compositions are shown in Tables 9 and 10.

The additive components used and abbreviations thereof in the tables are indicated below.

Antioxidant

Ph-2: tetrakis methylene[3,5-di-t-butyl-4-hydroxyphenyl) propionate]methane

P-2: tris(2,4-di-t-butylphenyl)phosphite

Neutralizer: calcium stearate

Anti-blocking agent: silica

Lubricant: oleic amide

TABLE 9

| Film-molding composition and single-layer film | | | | | | |
|---|---|---|---|---|---|---|
| | Example No. for film molding | | | | | |
| | 1 | 2 | 3 | 4 | 5 | 6 |
| Polypropylene composition (Cf) No. | Cf-1 | Cf-2 | Cf-3 | Cf-4 | Cf-5 | Cf-6 |
| Propylene composition (A) No. wt % | A-7 99.49 | A-8 99.49 | A-9 99.49 | A-10 99.49 | A-11 99.49 | A-12 99.49 |
| Antioxidant: Ph-2 wt % | 0.03 | 0.03 | 0.03 | 0.03 | 0.03 | 0.03 |
| Antioxidant: P-2 wt % | 0.08 | 0.08 | 0.08 | 0.08 | 0.08 | 0.08 |
| Neutralizer, calcium stearate wt % | 0.1 | 0.1 | 0.1 | 0.1 | 0.1 | 0.1 |
| Anti-blocking agent, silica wt % | 0.2 | 0.2 | 0.2 | 0.2 | 0.2 | 0.2 |
| Lubricant, oleic amide wt % | 0.1 | 0.1 | 0.1 | 0.1 | 0.1 | 0.1 |
| Physical properties of unstretched film | | | | | | |
| Transparency (haze) % | 9.1 | 4.0 | 6.0 | 2.0 | 5.8 | 3.2 |
| Tear strength in extruding direction N/mm | 24 | 45 | 51 | 26 | 60 | 33 |
| Cold resistance temperature ° C. | −20 | −25 | −25 | −20 | −20 | −25 |
| Heat resistance ° C. | 130 | 130 | 130 | 135 | 120 | 130 |
| Physical properties of biaxially oriented film | | | | | | |
| Transparency (haze) % | — | — | — | — | — | — |
| Tensile strength at break in extruding direction MPa | — | — | — | — | — | — |
| Heat resistance ° C. | — | — | — | — | — | — |
| Physical properties of uniaxially stretched film | | | | | | |
| Transparency (haze) % | — | — | — | — | — | — |
| Tear strength in extruding direction N/mm | — | — | — | — | — | — |
| Elongation at fracture in transverse direction % | — | — | — | — | — | — |
| Tensile strength at break in extruding direction MPa | — | — | — | — | — | — |

| | Example No. for film molding | | | | | |
|---|---|---|---|---|---|---|
| | 7 | 8 | 9 | 10 | 11 | 12 |
| Polypropylene composition (Cf) No. | Cf-7 | Cf-8 | Cf-9 | Cf-10 | Cf-11 | Cf-12 |
| Propylene composition (A) No. wt % | A-13 99.49 | A-14 99.49 | A-2 99.49 | A-4 99.49 | A-5 99.49 | A-6 99.49 |
| Antioxidant: Ph-2 wt % | 0.03 | 0.03 | 0.03 | 0.03 | 0.03 | 0.03 |
| Antioxidant: P-2 wt % | 0.08 | 0.08 | 0.08 | 0.08 | 0.08 | 0.08 |
| Neutralizer, calcium stearate wt % | 0.1 | 0.1 | 0.1 | 0.1 | 0.1 | 0.1 |
| Anti-blocking agent, silica wt % | 0.2 | 0.2 | 0.2 | 0.2 | 0.2 | 0.2 |
| Lubricant, oleic amide wt % | 0.1 | 0.1 | 0.1 | 0.1 | 0.1 | 0.1 |
| Physical properties of unstretched film | | | | | | |
| Transparency (haze) % | 14.3 | 4.2 | — | — | — | — |
| Tear strength in extruding direction N/mm | 40 | 47 | — | — | — | — |
| Cold resistance temperature ° C. | −25 | −25 | — | — | — | — |
| Heat resistance ° C. | 130 | 125 | — | — | — | — |
| Physical properties of biaxially oriented film | | | | | | |
| Transparency (haze) % | — | — | 12.4 | 15.0 | 17.8 | — |
| Tensile strength at break in extruding direction MPa | — | — | 130 | 130 | 110 | — |
| Heat resistance ° C. | — | — | 135 | 130 | 130 | — |
| Physical properties of uniaxially stretched film | | | | | | |
| Transparency (haze) % | — | — | 6.3 | 6.9 | 9.8 | — |
| Tear strength in extruding direction N/mm | — | — | 7.4 | 9.6 | 12.6 | — |
| Elongation at fracture in transverse direction % | — | — | 860 | 970 | 1140 | — |
| Tensile strength at break in extruding direction MPa | — | — | 260 | 250 | 230 | — |

TABLE 10

Film-molding comparative composition and single-layer film

| | Comparative Example No. for film molding | | | | |
|---|---|---|---|---|---|
| | 1 | 2 | 3 | 4 | 5 |
| Polypropylene composition (Cf) No. | cCf-1 | cCf-2 | cCf-3 | cCf-4 | cCf-5 |
| Propylene composition (A) No. | cA-8 | cA-9 | cA-10 | cA-11 | cA-12 |
| wt % | 99.49 | 99.49 | 99.49 | 99.49 | 99.49 |
| Antioxidant: Ph-2 wt % | 0.03 | 0.03 | 0.03 | 0.03 | 0.03 |
| Antioxidant: P-2 wt % | 0.08 | 0.08 | 0.08 | 0.08 | 0.08 |
| Neutralizer, calcium stearate wt % | 0.1 | 0.1 | 0.1 | 0.1 | 0.1 |
| Anti-blocking agent, silica wt % | 0.2 | 0.2 | 0.2 | 0.2 | 0.2 |
| Lubricant, oleic amide wt % | 0.1 | 0.1 | 0.1 | 0.1 | 0.1 |
| Physical properties of unstretched film | | | | | |
| Transparency (haze) % | 31.7 | 10.3 | 1.8 | 25.6 | 1.8 |
| Tear strength in extruding direction N/mm | 11 | 53 | 9 | 80 | 8 |
| Cold resistance temperature °C. | −25 | −10 | 0 | −30 | −5 |
| Heat resistance °C. | | | | | |
| Physical properties of biaxially oriented film | | | | | |
| Transparency (haze) % | — | — | — | — | — |
| Tensile strength at break in extruding direction MPa | — | — | — | — | — |
| Heat resistance °C. | — | — | — | — | — |
| Physical properties of uniaxially stretched film | | | | | |
| Transparency (haze) % | — | — | — | — | — |
| Tear strength in extruding direction N/mm | — | — | — | — | — |
| Elongation at fracture in transverse direction % | — | — | — | — | — |
| Tensile strength at break in extruding direction MPa | — | — | — | — | — |

| | Comparative Example No. for film molding | | | |
|---|---|---|---|---|
| | 6 | 7 | 8 | 9 |
| Polypropylene composition (Cf) No. | cCf-6 | cCf-7 | cCf-8 | cCf-9 |
| Propylene composition (A) No. | cA-13 | cA-14 | cA-5 | cA-6 |
| wt % | 99.49 | 99.49 | 99.49 | 99.49 |
| Antioxidant: Ph-2 wt % | 0.03 | 0.03 | 0.03 | 0.03 |
| Antioxidant: P-2 wt % | 0.08 | 0.08 | 0.08 | 0.08 |
| Neutralizer, calcium stearate wt % | 0.1 | 0.1 | 0.1 | 0.1 |
| Anti-blocking agent, silica wt % | 0.2 | 0.2 | 0.2 | 0.2 |
| Lubricant, oleic amide wt % | 0.1 | 0.1 | 0.1 | 0.1 |
| Physical properties of unstretched film | | | | |
| Transparency (haze) % | 74.7 | 4.0 | — | — |
| Tear strength in extruding direction N/mm | 10 | 51 | — | — |
| Cold resistance temperature °C. | −25 | −25 | — | — |
| Heat resistance °C. | | 115 | — | — |
| Physical properties of biaxially oriented film | | | | |
| Transparency (haze) % | — | — | 43.4 | 69.8 |
| Tensile strength at break in extruding direction MPa | — | — | 100 | 100 |
| Heat resistance °C. | — | — | 110 | 110 |
| Physical properties of uniaxially stretched film | | | | |
| Transparency (haze) % | — | — | 39.7 | 51.3 |
| Tear strength in extruding direction N/mm | — | — | 2.2 | 1.6 |
| Elongation at fracture in transverse direction % | — | — | 480 | 390 |
| Tensile strength at break in extruding direction MPa | — | — | 180 | 190 |

2) Molding of Single-layer Film a) Unstretched Film

The compositions Cf-1 to Cf-8 and cCf-1 to cCf-7 were extruded using a single-layer extruder (bore diameter: 65 mmφ) equipped with a T-die at an extruding temperature of 230° C., and rapidly cooled by an air chamber and a cooling roll with a surface temperature of 30° C. to obtain an unstretched film of 25 μm thick.

b) Biaxially Oriented Film

The compositions Cf-9 to Cf-11 and cCf-8 and -9 were extruded using a single-layer extruder (bore diameter: 40 mmφ) equipped with a T-die at an extruding temperature of 230° C., and rapidly cooled and solidified by an air knife and a cooling roll with a surface temperature of 30° C. to mold an unstretched sheet of 2.0 mm thick. Then the resulting unstretched sheet was biaxially oriented (5.0 times in the extruding direction and 8.0 times in the transverse direction) using a batch type biaxially orienting machine at a stretching temperature of 157° C. to obtain a biaxially oriented film of 50 μm thick.

c) Uniaxially Stretched Film

The compositions Cf-9 to Cf-11 and cCf-8 and -9 were extruded using a single-layer extruder (bore diameter: 40 mmφ) equipped with a T-die at an extruding temperature of 230° C., and rapidly cooled and solidified by an air knife and a cooling roll with a surface temperature of 60° C. to mold an unstretched sheet of 0.25 mm thick. Then the resulting unstretched sheet was uniaxially stretched 5.0 times in the extruding direction using a batch type uniaxially stretching machine at a stretching temperature of 120° C. to obtain a uniaxially stretched film of 50 μm thick.

3) Molding of Multi-layered Film a) Unstretched Film

Using the polypropylene compositions Cf-2 and -4 of the present invention, the comparative compositions cCf-1 and -6, as well as the following polyolefin compositions, an unstretched film of two components-three layers or three components-three layers was prepared.

Polyolefin Composition

PO-1: A composition in the form of pellets obtained by incorporating 99.49% by weight of a propylene homopolymer having the density of 0.90 g/cm$^3$, the crystalline melting point of 163° C. and the melt flow rate (MFR) of 7.0 g/10 min., with 0.03% by weight of tetrakis[methylene(3,5-di-t-butyl-4-hydroxyphenyl)propionate]methane, 0.08% by weight of tris(2,4-di-t-butylphenyl)phosphite, 0.1% by weight of calcium stearate, 0.2% by weight of silica (anti-blocking agent) and 0.1% by weight of oleic amide (lubricant), and mixing by Henschel mixer (trade name), melt-kneading using a single screw extruder (bore diameter: 40 mmφ), and molding the mixture into pellets.

PO-2: A composition in the form of pellets obtained by incorporating 99.49% by weight of a propylene-ethylene-butene-1 copolymer having the density of 0.90 g/cm$^3$, the crystalline melting point of 132° C. and the melt flow rate (MFR) of 6.0 g/10 min., with 0.03% by weight of tetrakis [methylene(3,5-di-t-butyl-4-hydroxyphenyl)-propionate] methane, 0.08% by weight of tris(2,4-di-t-butylphenyl) phosphite, 0.1% by weight of calcium stearate, 0.2% by weight of silica (anti-blocking agent), and 0.1% by weight of oleic amide (lubricant), and mixing by Henschel mixer (trade name), melt-kneading using a single screw extruder (bore diameter: 40 mmφ), and molding the mixture a into pellets.

Using an extruder for molding a film of three components-three layers, equipped with a multi-layer T-die (including one single screw extruder for intermediate layers having a bore diameter of 65 mmφ, and two single screw extruders for surface layers having a bore diameter of 50 mmφ), the polypropylene composition was fed to the single screw extruder for intermediate layers, and the polyolefin composition was fed to the single screw extruders for surface layers, and these compositions were molten at 230° C., subjected to multi-layers (two components-three layers or three components-three layers) co-extrusion, and then cooled and solidified in an air chamber and a cooling roll with a surface temperature of 30° C. to obtain an unstretched film of two components-three layers or three components-three layers.

The layer configuration is shown in Tables 11 and 12.

b) Biaxially Oriented Film

Using the three components-three layers extruder equipped with a multi-layer T-die (including one single screw extruder for intermediate layers having a bore diameter of 65 mmφ, and two single screw extruders for surface layers having a bore diameter of 50 mmφ), the polypropylene composition Cf-12 or cCf-8 was fed to the single screw extruder for intermediate layers, and the polyolefin composition was fed to the single screw extruders for surface layers, and these compositions were molten at 230° C., subjected to multi-layers (two components-three layers) co-extrusion, and then cooled and solidified by an air knife and a cooling roll with a surface temperature of 30° C. to obtain an unstretched sheet of two components-three layers of 2.0 mm thick (thickness ratio: 1/18/1). Then the resulting unstretched sheet was biaxially oriented (5.0 times in the extruding direction and 8.0 times in the transverse direction) using a batch type biaxially orienting machine at a stretching temperature of 157° C. to obtain a biaxially oriented film of 50 μm thick.

The layer configuration is shown in Tables 11 and 12.

TABLE 11

Multi-layered film (Example)

| | Example No. for film molding | | | | | |
|---|---|---|---|---|---|---|
| | 13 | 14 | 15 | 16 | 17 | 18 |
| Layer configuration | | | | | | |
| Intermediate layer, polypropylene composition (Cf) | Cf-2 | Cf-4 | Cf-2 | Cf-4 | Cf-12 | Cf-12 |
| Skin layer 1, polyolefin composition | PO-2 | PO-2 | PO-1 | PO-1 | PO-1 | PO-2 |
| Skin layer 2, polyolefin composition | PO-2 | PO-2 | PO-2 | PO-2 | PO-1 | PO-2 |
| Physical properties of unstretched multi-layer film | | | | | | |
| Transparency (haze) % | 2.2 | 1.8 | 2.3 | 1.8 | — | — |

TABLE 11-continued

Multi-layered film (Example)

| | Example No. for film molding | | | | | |
|---|---|---|---|---|---|---|
| | 13 | 14 | 15 | 16 | 17 | 18 |
| Gloss % | 115 | 119 | 116 | 119 | — | — |
| Tear strength in extruding direction N/mm | 40 | 23 | 38 | 23 | — | — |
| Cold resistance temperature ° C. | −25 | −20 | −20 | −15 | — | — |
| Heat resistance ° C. | 135 | 140 | 140 | 145 | — | — |
| Heat-sealing temperature ° C. | — | — | 130 | 130 | — | — |
| Physical properties of biaxially oriented film | | | | | | |
| Transparency (haze) % | — | — | — | — | 0.2 | 1.8 |
| Tensile strength at fracture in extruding direction MPa | — | — | — | — | 150 | 130 |
| Heat-sealing temperature ° C. | — | — | — | — | — | 130 |

TABLE 12

Multi-layered film (Comparative Example)

| | Comparative Example No. for film molding | | | | |
|---|---|---|---|---|---|
| | 10 | 11 | 12 | 13 | 14 |
| Layer configuration | | | | | |
| Intermediate layer, polypropylene composition (Cf) | cCf-1 | cCf-6 | cCf-6 | cCf-8 | cCf-8 |
| Skin layer 1, polyolefin composition | PO-2 | PO-2 | PO-1 | PO-1 | PO-2 |
| Skin layer 2, polyolefin composition | PO-2 | PO-2 | PO-2 | PO-1 | PO-2 |
| Physical properties of unstretched multi-layer film | | | | | |
| Transparency (haze) % | 4.2 | 6.7 | 6.8 | — | — |
| Gloss % | 90 | 81 | 80 | — | — |
| Tear strength in extruding direction N/mm | 10 | 8 | 8 | — | — |
| Cold resistance temperature ° C. | −25 | −25 | −20 | — | — |
| Heat resistance ° C. | 135 | 135 | 140 | — | — |
| Heat-sealing temperature ° C. | — | — | 130 | — | — |
| Physical properties of biaxially oriented film | | | | | |
| Transparency (haze) % | — | — | — | 12.7 | 10.4 |
| Tensile strength at fracture in extruding direction MPa | — | — | — | 110 | 90 |
| Heat-sealing temperature ° C. | — | — | — | — | 130 |

4) Physical Properties of Films

The single layer films and the multi-layered films were evaluated with regard to the following physical properties.
a) Transparency (%); Haze of the film was measured according to ASTM D 1003, and used as a standard of transparency.
b) Gloss (%): Gloss of the film was measured at an angle of 20° according to ASTM D 523.
c) Tear strength (N/mm): Elmendorf tear strength of the film was measured according to ASTM D 1922.
d) Tensile strength at break (MPa): Tensile strength at break of the film was measured according to ASTM D 882.
e) Tensile elongation at break (MPa): Tensile elongation at break of the film was measured according to ASTM D 882.
f) Cold resistance temperature (° C.): After retaining a film in a bath at a constant cold temperature for 15 minutes, an impact strength of the film was measured according to ASTM D 781. When the film which had been retained in the bath at a cold temperature had an impact strength of not less than 0.5 J, the temperature of the bath at that time was expressed as a cold resistance temperature.

g) Heat resistance (° C.): A sample of 10×100 mm strip which had been cut out from the film was retained in a silicone oil bath set at a predetermined temperature for 10 minutes, and measured for the length in longer direction. When the length of the sample is decreased by more than 2% based on its initial length, the temperature of the oil bath in which the sample was retained was expressed as a heat resistance. h) Heat sealing temperature (° C.): The film was dry laminated with a biaxially oriented polypropylene film (20μ) by using an adhesive, and the laminated film was heat-sealed over 10 mm width at a sealing pressure of 2 MPa for 0.5 second at sealing temperatures ranging from 130° C. to 190° C. with a temperature difference of 5° C. (8 temperature conditions in total). Using a 15 mm wide strip sample cut out from the film, a peel test was carried out at the different sealing temperatures on the sealed part of the sample at 90° C. by measuring the peel strength by means of a tensile machine at a tensile speed of 300 mm/min. When the sealed part had a peel strength not less than 0.5 N/15 mm, the corresponding minimum sealing temperature was expressed as the heat sealing temperature.

The results of the evaluation on the single-layer films are shown in Tables 9 and 10, and those on the multi-layered films are shown in Tables 11 and 12.

E. Polypropylene Composition (Cb) for Blow Molded Articles and its Blow Molded Articles 1) Polypropylene Composition Each of the propylene compositions A-1 and A-2 according to the present invention and the comparative compositions cA-3 was incorporated with various additive components and mixed using Henschel mixer, and the mixture was melt-kneaded and extruded by an extruder set at 250° C. to prepatre pellets of the polypropylene compositions Cb-1 to Cb-7 and the comparative compositions cCb-1 to cCb-4.

The polypropylene compositions and the comparative compositions are shown in Tables 13 and 14.

The additive components used and abbreviations thereof in the tables are shown below.

Plasticizing Components

LPDE: a low density polyethylene having the melt flow rate (MFR) of 0.4 g/10 min., the crystalline melting point of 110° C., and the density of 0.920 g/cm$^3$.

EVAC: an ethylene-vinyl acetate copolymer having the melt flow rate (MFR) of 0.5 g/10 min., the crystalline melting point of 1040° C., the density of 0.925 g/cm$^3$, and the butyl acetate content of 3% by weight.

Antioxidants and neutralizers: the same as the above.

TABLE 13

Molding composition for blow-molded article and its blow-molded article

| | Example No. of blow-molded article | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polypropylene composition (Cf) No. | Cb-1 | Cb-2 | Cb-3 | Cb-4 | Cb-5 | Cb-6 | Cb-1 | Cb-1 | Cb-2 | Cb-2 | Cb-7 | Cb-7 |
| Propylene composition (A) No. | A-1 | A-1 | A-1 | A-2 | A-2 | A-2 | A-1 | A-1 | A-1 | A-1 | A-1 | A-1 |
| part by weight | 100 | 100 | 100 | 100 | 100 | 100 | 100 | 100 | 100 | 100 | 100 | 100 |
| Plasticizing component | | | | | | | | | | | | |
| type | — | LDPE | LDPE | — | EVAC | EVAC | — | — | LDPE | LDPE | EVAC | EVAC |
| part by weight | — | 10 | 15 | — | 10 | 15 | — | — | 10 | 10 | 10 | 10 |
| Antioxidant: Ph-2 part by weight | 0.15 | 0.15 | 0.15 | 0.15 | 0.15 | 0.15 | 0.15 | 0.15 | 0.15 | 0.15 | 0.15 | 0.15 |
| Antioxidant: P-2 part by weight | 0.05 | 0.05 | 0.05 | 0.05 | 0.05 | 0.05 | 0.05 | 0.05 | 0.05 | 0.05 | 0.05 | 0.05 |
| Neutralizer, calcium stearate part by weight | 0.1 | 0.1 | 0.1 | 0.1 | 0.1 | 0.1 | 0.1 | 0.1 | 0.1 | 0.1 | 0.1 | 0.1 |
| Bonding resin composition | — | — | — | — | — | — | EP-1 | EP-2 | EP-1 | EP-2 | EP-1 | EP-2 |
| Physical properties of blow-molded article | | | | | | | | | | | | |
| Moldability | A | A | A | A | A | A | A | A | A | A | A | A |
| Flexibility | B | A | A | B | A | A | B | B | A | A | A | A |
| Impact-whitening resistance | A | A | A | A | A | A | A | A | A | A | A | A |
| Heat resistance | A | A | A | A | A | A | A | A | A | A | A | A |
| Weldability | A | A | A | A | B | B | A | A | A | A | A | A |
| Bonding Strength | — | — | — | — | — | — | A | A | A | A | A | A |

TABLE 14

Comparative molding composition for blow-molded article and its blow-molded article

| | Comparative Example No. of blow-molded article | | | | | | |
|---|---|---|---|---|---|---|---|
| | 1 | 2 | 3 | 4 | 5 | 6 | 7 |
| Polypropylene composition (Cf) No. | cCb-1 | cCb-2 | Cb-3 | Cb-1 | cCb-1 | cCb-2 | cCb-4 |
| Propylene composition (A) No. | cA-3 | cA-3 | A-1 | cA-3 | cA-3 | cA-3 | cA-3 |
| part by weight | 100 | 100 | 100 | 100 | 100 | 100 | 100 |
| Plasticizing component | | | | | | | |
| type | — | LDPE | EVAC | — | — | LDPE | EVAC |

TABLE 14-continued

Comparative molding composition for blow-molded article and its blow-molded article

| | Comparative Example No. of blow-molded article | | | | | | |
|---|---|---|---|---|---|---|---|
| | 1 | 2 | 3 | 4 | 5 | 6 | 7 |
| part by weight | — | 10 | 15 | — | — | 10 | 10 |
| Antioxidant: Ph-2 part by weight | 0.15 | 0.15 | 0.15 | 0.15 | 0.15 | 0.15 | 0.15 |
| Antioxidant: P-2 part by weight | 0.05 | 0.05 | 0.05 | 0.05 | 0.05 | 0.05 | 0.05 |
| Neutralizer, calcium stearate part by weight | 0.1 | 0.1 | 0.1 | 0.1 | 0.1 | 0.1 | 0.1 |
| Bonding resin composition | — | — | — | EP-1 | EP-2 | EP-1 | EP-2 |
| Physical properties of blow-molded article | | | | | | | |
| Moldability | A | A | A | A | A | A | A |
| Flexibility | B | A | A | B | B | A | A |
| Impact-whitening resistance | C | C | C | C | C | C | C |
| Heat resistance | A | A | A | A | B | A | A |
| Weldability | C | C | C | C | C | C | C |
| Bonding Strength | — | — | — | C | C | C | C |

2) Molding of Blow Molded Articles a) Blow Molded Articles (single article)

The pellets of the polypropylene compositions Cb-1 to Cb-6 or cCb-1 to cCb-3 as prepared above were fed to an extruder of a blow molding machine (SN-50, manufactured by Praco Corporation) and extruded into a parison at 200° C. The parison was molded into a cylindrical blow molded article having a bellows structure at the side (60φ×300×1.6 mm thick, having the bellows structure with 7 pitches, pitch interval 10 mm, channel depth 10 mm, average thickness of the bellows part 0.9 mm provided at the center of the article) by blowing in a mold adjusted at 30° C. The upper and bottom parts were cut away from the article to obtain a blow molded article.

b) Blow Molded Articles (composite article)

The pellets of the polypropylene compositions Cb-1, Cb-2 or Cb-7, or comparative compositions cCb-1, cCb-2 or cCb-4 were fed to one of the two extruders in a blow molding machine, and any one of the polymer compositions shown below was fed to the other extruder. Initially, a parison was extruded from the former (first) extruder at 200° C. and then another parison was extruded from the second extruder at 200° C. to make a parison in which two parisons of the two compositions were connected. The resulting parison was molded into a cylindrical blow molded article having a bellows structure at the side (60φ×300×1.6 mm thick, having the bellows structure with 7 pitches, pitch interval 10 mm, channel depth 10 mm, average thickness of the bellows part 0.9 mm provided at the center of the product) by blowing in a mold adjusted at 30° C. During the molding, adjustment was made to locate the parison from the first extruder at the bellows part. The upper and bottom parts were cut away to obtain a blow molded article (composite article).

EP-1: A polymer composition having the crystalline melting point of 165° C., the bending modulus of 1,100 MPa, and MFR of 0.65 g/10 min., which was prepared by adding to 100 parts by weight of a propylene composition consisting of an ethylene-propylene copolymer (12.7% by weight) with the ethylene content of 59% by weight and a propylene homopolymer (87.3% by weight), 0.05% by weight of tris(2,4-di-t-butylphenyl)phosphite, 0.15 part by weight of tetrakis[methylene(3,5-di-t-butyl-4-hydroxyhydrocinnamate)]-methane and 0.1 part by weight of calcium stearate.

EP-2: A polymer composition having the bending modulus of 2,100 MPa and MFR of 0.72 g/10 min., which was prepared by adding to 100 parts by weight of EP-1, 10 parts by weight of talc having an average particle size of 1.6 gm.

Combinations of the polypropylene composition and the polymer composition are shown in Tables 13 and 14.

3) Evaluation of Blow Molded Articles

The blow molded articles as produced above were evaluated for the following properties according to the following evaluation standards.

a) Moldability: A molten parison was extruded under the conditions of a molding temperature of 200° C., screw diameter of 50φ, screw speed of 40 rpmn (dice diameter 21 mm, core size 19 mm), the sagging speeds of the parison drawing down by 12 cm and 50 cm were measured, respectively. The moldability was judged based on the difference between these speeds (50 cm drawdown speed–12 cm drawdown speed).

A: Drawdown is small and the speed difference is less than 5%.

B: Drawdown speed difference is 5 to 20%.

C: Drawdown speed difference is more than 20%.

b) Flexibility: The blow molded article was fixed at one end in a chamber at 23±2° C. and a load of 1 kg was applied at the other end. Deformation of the article was evaluated by the deformation angle.

A: Deformation angle is not less than 30 degrees.

B: Deformation angle is not less than 20 degrees and less than 30 degrees.

C: Deformation angle is not less than 10 degrees and less than 20 degrees.

D: Deformation angle is less than 10 degrees.

c) Impact-whitening resistance: A blow molded article was laid horizontally in an environment at 20–25° C., and an impacting rod (190 g) with a tip of 6.35 mm in radius was placed on the part of the article where a polypropylene composition was used and a load (500 g) was dropped on the center of impact from a height of 50 cm. The diameter of the whitened surface generated around the center of impact was measured.

A: Flaws are observed around the center of impact, but no whitening is observed.

B: Whitened part around the center of impact is less than 8 mmφ.

C: Whitened part around the center of impact is 8 to 15 mmφ.

D: Whitened part around the center of impact is more than 15 mmφ.

d) Heat resistance: Deformation and appearance of the molded article after allowing to stand in an oven at 150° C. for 500 hours were visually observed.

A: Neither deformation nor abnormal appearance is observed.

B: Change in dimension is not more than 2% and there is almost no change in appearance (deterioration).

C: Change in dimension is not less than 2% and there is a change in appearance (deterioration).

e) Weld strength: The welded part of the molded article was compressed (50 mm), and whitening and cracks generated in the extruding direction of the parison were visually observed.

A: Neither whitening nor crack is generated.

C: Whitening or cracks are generated.

f) Bonding strength: A test piece was cut out from the part of the cylindrically molded article where a polymer composition and other composition are bonded, and measured for the tensile strength. The values thus obtained were compared with the following standard values.

Standard article: a test piece cut out from the part of the blow molded article made from a polypropylene composition.

A: a strength more than 85% of that of the standard article

B: a strength in the range of 85 to 70% of that of the standard article

C: a strength less than 70% of that of the standard article

The evaluation results of the physical properties are shown in Tables 13 and 14.

EFFECT OF THE INVENTION

The propylene compositions of the present invention are suitably used as a base resin of the polypropylene compositions for producing various molded articles which are excellent in moldability, molding shrinkage, rigidity, flexibility, impact resistance, particularly low-temperature impact resistance, transparency, gloss and stress-whitening resistance, and which are well balanced in these properties.

In the injection molded articles made from the polypropylene compositions including as a base resin the propylene compositions of the present invention, molding shrinkage of the articles is approximately 1 and the articles exhibit a high bending modulus (rigidity) when the product $([\eta]_{RC}/[\eta]_{PP}) \times (W_{PP}/W_{RC})$ of the intrinsic viscosity ratio and the weight ratio of the propylene homopolymers (PP) to the propylene-ethylene copolymers (RC) is within the range of from 1.0 to 3.0, as shown in FIGS. 1 and 2, and the articles also exhibit excellent low-temperature impact resistance, transparency, gloss and stress-whitening resistance as shown in Tables 3 and 5. In the polypropylene compositions Ci-7 to Ci-12 with which an α-crystal nucleating agent is incorporated, low-temperature impact resistance is more improved. In the polypropylene compositions Ci-13 to Ci-18 with which a radical generating agent and/or a high crystalline propylene homopolymer are incorporated, stress-whitening resistance is more improved as shown in Tables 4 and 6.

By using these polypropylene compositions, various sheet-like molded articles, containers and caps therefor, and other molded articles having complicated structures such as those having a hinge structure can be produced by an injection molding.

The sheets made from the polypropylene compositions including as a base resin the propylene compositions of the present invention are excellent in punching impact strength, whitening resistance on folding and printability, and are well balanced in tensile strength at yield and Young's modulus depending on their molding methods, as shown in Tables 7 and 8.

The single-layer films molded from the polypropylene compositions including as a base resin the propylene compositions of the present invention provide unstretched, biaxially oriented and uniaxially stretched films which are excellent in transparency and heat resistance and which are well balanced in mechanical properties such as tear strength, tensile strength at break, tensile elongation at break and low-temperature impact resistance, as shown in Tables 9 and 10. The multi-layered films of the polypropylene compositions and the polyolefin compositions have an excellent heat sealing property while maintaining the properties of the above-mentioned single-layer films, as shown in Tables 11 and 12.

These films are suitable as various packaging films including those for foods.

The blow molded articles, particularly those having a bellows structure, which are molded from the polypropylene compositions comprising as a base resin the propylene compositions of the present invention are excellent in moldability, flexibility, stress-whitening resistance, heat resistance, and weld properties. Particularly when polypropylene compositions Cb-2, -3, -5 and -7 incorporated with a plasiticizing component are used, flexibility is more improved. The composite articles where other polymer compositions are bonded have a high bonding strength.

The blow molded articles having a bellows structure and the composites thereof are suitable as air ducts, etc.

The present invention provides the polypropylene compositions used for molding various molded articles as well as propylene compositions suitable as the base resins thereof, which is of a great significance in the field concerned.

Figure 1:
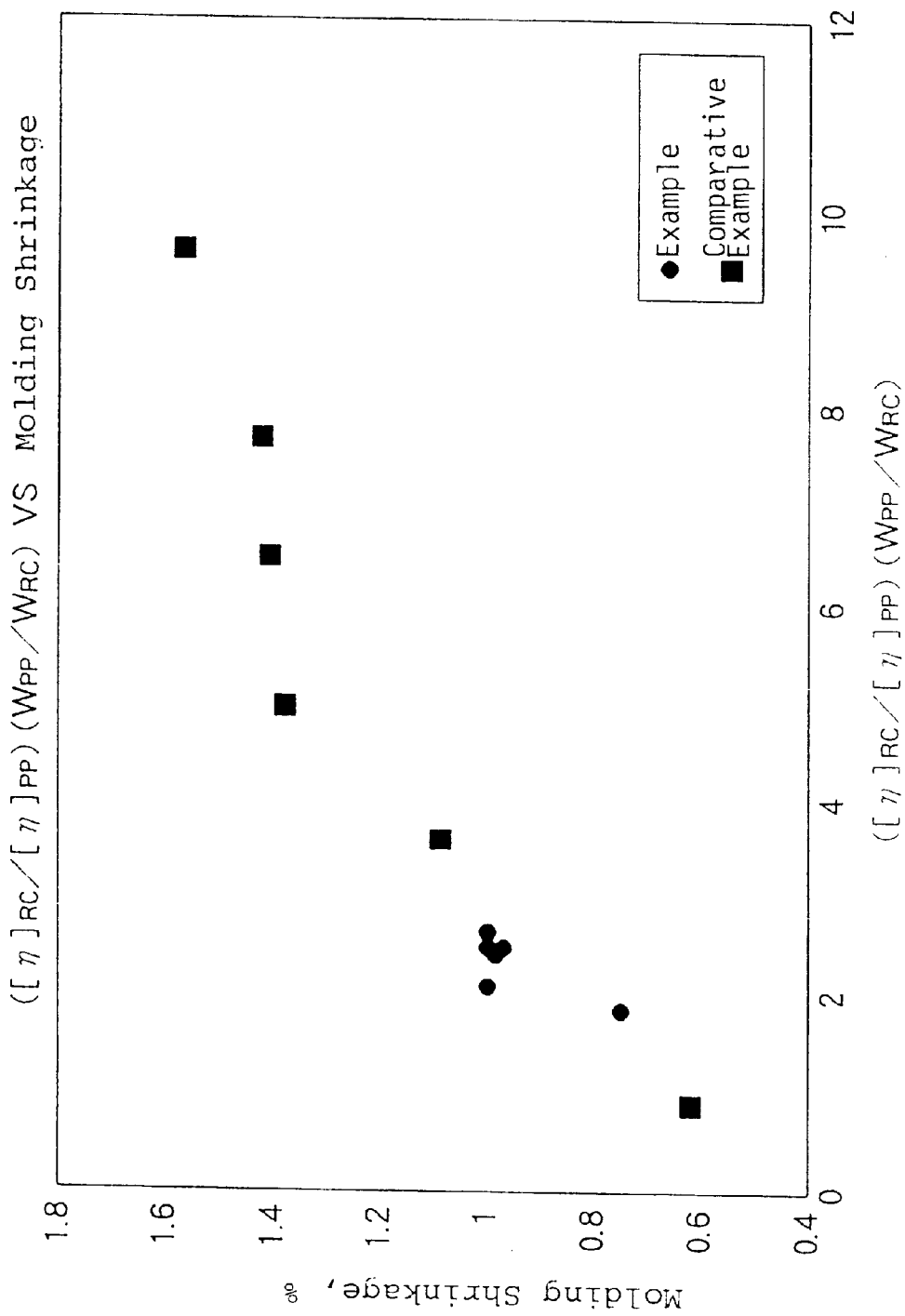
FIG. 1 shows a curve representing a molding shrinkage relative to the product $([\eta]_{RC}/[\eta]_{PP}) \times (W_{PP}/W_{RC})$ of the intrinsic viscosity ratio and the weight ratio of the propylene homopolymers (PP) to the propylene-ethylene copolymers (RC).
Figure 2:
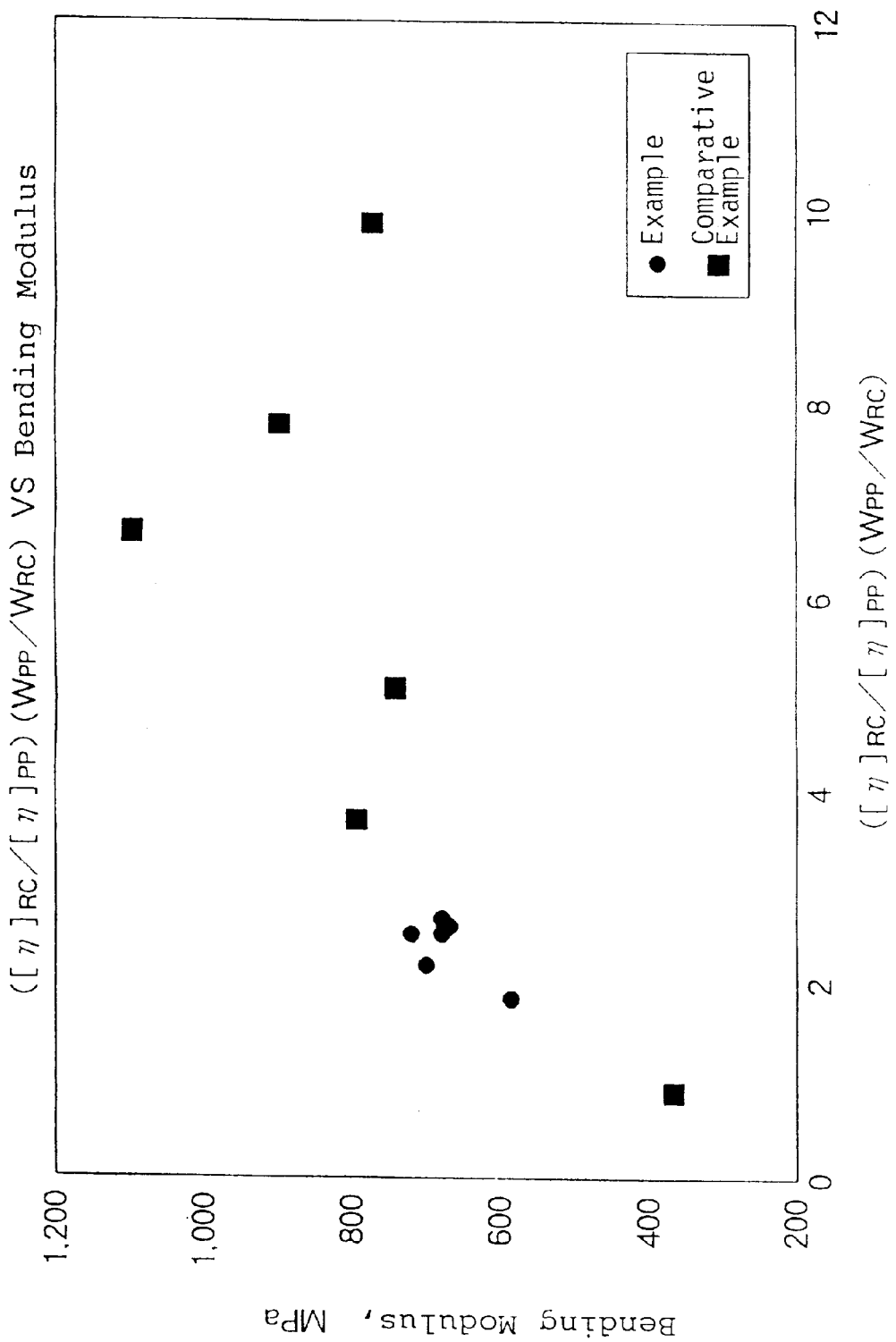
FIG. 2 shows a curve representing a bending modulus relative to the product $([\eta]_{RC}/[\eta]_{PP}) \times (W_{PP}/W_{RC})$ of the intrinsic viscosity ratio and the weight ratio of the propylene homopolymers (PP) to the propylene-ethylene copolymers (RC).
Figure 3:
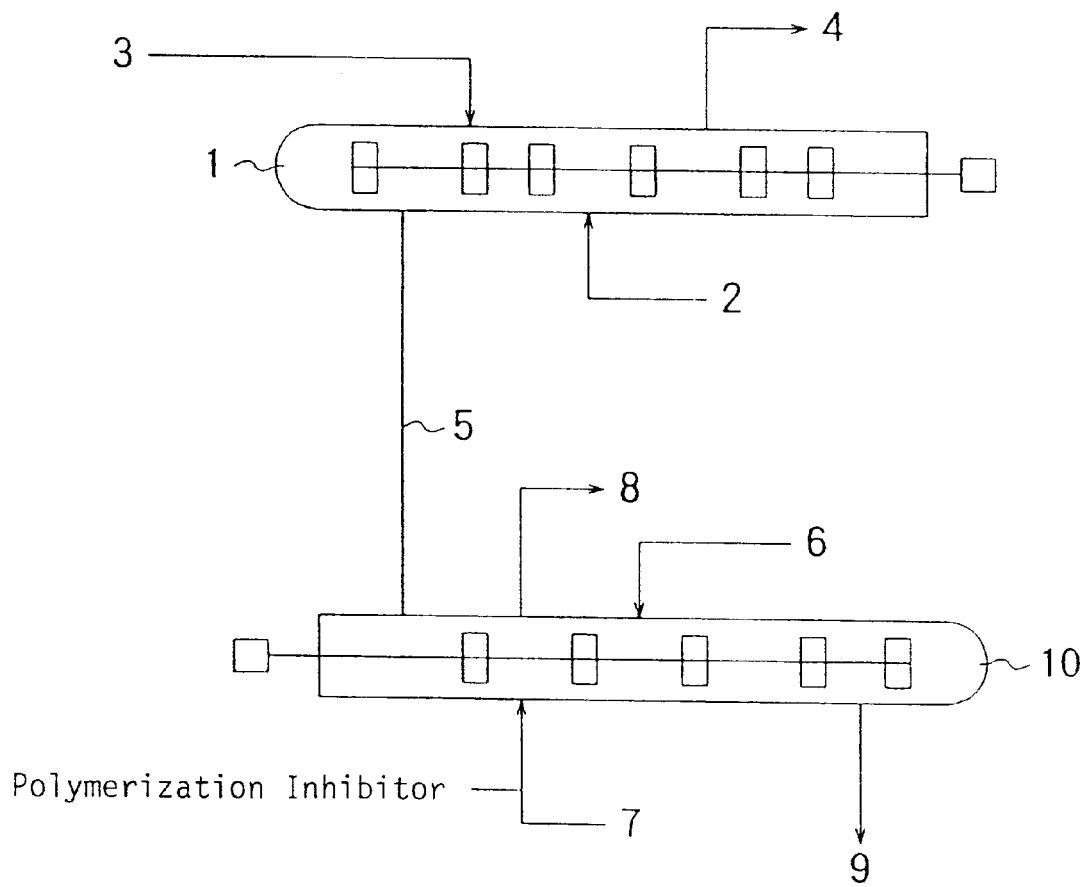
FIG. 3 is a flow sheet of the continuous polymerization apparatus for the propylene compositions used in the examples.

Explanation on Symbols 1, 10: polymerization reactor, 2: piping for hydrogen, 3: piping for starting propylene, 4, 8: piping for unreacted gases, 5, 9: piping for removing polymers, 6: piping for starting mixed gases.

What is claimed is:

1. A propylene composition comprising a propylene homopolymer and a propylene-ethylene copolymer, characterized in that an intrinsic viscosity ($[\eta]_{RC}$) of the propylene-ethylene copolymer is in the range of 1.7 to 2.8 dl/g, the ratio ($[\eta]_{RC}/[\eta]_{PP}$) of an intrinsic viscosity of the propylene-ethylene copolymer to an intrinsic viscosity of the propylene homopolymer is in the range of 0.7 to 1.2 and a product $[(W_{PP}/W_{RC}) \times ([\eta]_{RC}/[\eta]_{PP})]$ of the weight ratio ($W_{PP}/W_{RC}$) of the propylene homopolymer to the propylene-ethylene copolymer and the intrinsic viscosity ratio ($[\eta]_{RC}/[\eta]_{PP}$) thereof is in the range of 1.0 to 3.0.

2. The propylene composition of claim 1 wherein the propylene homopolymer has an isotactic pentad (P) of not less than 0.95.

3. The propylene composition of claim 1 wherein the propylene-ethylene copolymer contains 25–55 wt. % of an ethylene unit on the weight basis of the propylene-ethylene copolymer.

4. The propylene composition of claim 1 or 3 wherein the propylene-ethylene copolymer contains not less than 80 wt. % of a component soluble in xylene at 20° C. on the weight basis of the propylene-ethylene copolymer.

5. The propylene composition of claim 1, containing 22–40 wt. % of the propylene-ethylene copolymer, on the weight basis of the propylene composition.

6. The propylene composition of any one of claims 1–5, having the Q value (Mw/Mn) of not more than 5.

7. A process for the production of a propylene composition comprising a propylene homopolymer and a propylene-ethylene copolymer, which comprises conducting a first polymerization step wherein propylene is polymerized in a vapor phase in the presence of a catalyst for a stereoregular olefin polymerization which comprises a combination of
   (a) a titanium-containing solid catalyst component having an average particle size of 25–300 μm,
   (b) an organoaluminum compound of the formula $AlR^1_m X_{3-m}$ wherein $R^1$ is a hydrocarbyl group of 1–20 carbons, X is a halogen atom and m is a positive number of $3 \geq m \geq 1.5$, and
   (c) an organosilicon compound of the formula $R^1_X R^3_Y Si (OR^4)_Z$ wherein $R^2$ and $R^4$ are a hydrocarbyl group, $R^3$ is a hydrocarbyl group or a hydrocarbyl group containing a hetero atom, X, Y and Z have a relationship of $0 \leq X \leq 2, 1 \leq Y \leq 3, 1 \leq Z \leq 3$, and X+Y+Z=4, to produce 78–60 wt. % of a propylene homopolymer on the total weight basis of the composition,
and then conducting a second polymerization step wherein ethylene and propylene are copolymerized, to produce 22–40 wt. % of a propylene-ethylene copolymer having an ethylene unit of 25–55 wt. %, on the total weight basis of the composition, wherein in the propylene composition produced, the intrinsic viscosity $([\eta]_{RC})$ of the propylene-ethylene copolymer is in the range of 1.7 to 2.8 dl/g, the ratio $([\eta]_{RC}/[\eta]_{PP})$ of an intrinsic viscosity of the propylene-ethylene copolymer to an intrinsic viscosity of the propylene homopolymer is in the range of 0.7 to 1.2, and a product $[(W_{PP}/W_{RC}) \times ([\eta]_{RC}/[\eta]_{PP})]$ of the weight ratio $(W_{PP}/W_{RC})$ of the propylene homopolymer to the propylene-ethylene copolymer and the intrinsic viscosity ratio $([\eta]_{RC}/[\eta]_{PP})$ thereof is in the range of 1.0 to 3.0.

8. The process of claim 7 further comprising a preactivation step of the catalyst for the stereoregular olefin polymerization, prior to the first polymerization step.

9. The process of claim 7 wherein (a) the titanium-containing solid catalyst component has a particle uniformity of not more than 2.0.

10. The process of claim 7 wherein a molar ratio (b/c) of the organoaluminum compound (b) to the organosilicon compound (c) is in the range of from 1 to 10.

11. A polypropylene composition comprising the propylene composition of claim 1 as a base resin.

12. The polypropylene composition of claim 11 comprising an antioxidant and a neutralizer.

13. The polypropylene composition of claim 12 wherein the antioxidant is a phenolic heat stabilizer and/or a phosphorus heat stabilizer, and the neutralizer is calcium stearate.

14. The polypropylene composition of any one of claims 11–13 further comprising 0.0001–1 wt. % of an α-crystal nucleating agent.

15. The polypropylene composition of claim 14 wherein the α-crystal nucleating agent is talc, metal aromatic carboxylates, dibenzylidene sorbitol compounds, metal aromatic phosphates, poly(3-methyl-1-butene), polyvinylcyclohexane, polyallyltrimethylsilane or a mixture thereof.

16. The polypropylene composition of claim 11, further comprising a radical generator.

17. The polypropylene composition of claim 16 wherein the radical generator is an organic peroxide.

18. The polypropylene composition of claim 11, further comprising 10–95 wt. %, on the basis of the resin, of propylene homopolymer having a density of 0.91–0.89 g/cm$^3$ and a melt flow rate ratio of the homopolymer to the propylene composition being in the range of 0.5–2.

19. The polypropylene composition of claim 11, further comprising 5–20 parts by weight of a flexibilizing component based on 100 parts by weight of the polypropylene composition.

20. The polypropylene composition of claim 19 wherein the flexibilizing component is an ethylene homopolymer or an ethylene-α-olefin copolymer having the density of 0.910–0.930 g/cm$^3$ and the crystalline melting point (Tm) of 100–115° C. and/or an ethylene-vinyl acetate copolymer having the density of 0.92–0.935 g/cm$^3$, the crystalline melting point (Tm) of 90–108° C. and the vinyl acetate unit of 1–10 wt. %.

21. A molded article made from the polypropylene composition of claim 11.

22. A process for the production of the molded article of claim 21 which comprises subjecting to injection molding a pellet of a polypropylene composition comprising a propylene homopolymer and a propylene-ethylene copolymer, characterized in that an intrinsic viscosity $([\eta]_{RC})$ of the propylene-ethylene copolymer is in the range of 1.7 to 2.8 dl/g, the ratio $([\eta]_{RC}/[\eta]_{PP})$ of an intrinsic viscosity of the propylene-ethylene copolymer to an intrinsic viscosity of the propylene homopolymer is in the range of 0.7 to 1.2, and a product $[(W_{PP}/W_{RC}) \times ([\eta]_{RC}/[\eta]_{PP})]$ of the weight ratio $(W_{PP}/W_{RC})$ of the propylene homopolymer to the propylene-ethylene copolymer and the intrinsic viscosity ratio $([\eta]_{RC}/[\eta]_{PP})$ thereof is in the range of 1.0 to 3.0.

23. A sheet formed from the polypropylene composition of claim 11.

24. A process for the production of the sheet of claim 23 which comprises subjecting to T-die extrusion a pellet of a polypropylene composition under the conditions wherein the resin temperature is 180–300° C., the cooling roll temperature is 5–80° C., the difference between the resin temperature and cooling roll temperature is not less than 120° C. and the line speed is 0.1–100 m/min, wherein said propylene composition comprises a propylene homopolymer and a propylene-ethylene copolymer, characterized in that an intrinsic viscosity $([\eta]_{RC})$ of the propylene-ethylene copolymer is in the range of 1.7 to 2.8 dl/g, the ratio $([\eta]_{RC}/[\eta]_{PP})$ of an intrinsic viscosity of the propylene-ethylene copolymer to an intrinsic viscosity of the propylene homopolymer is in the range of 0.7 to 1.2, and a product $[(W_{PP}/W_{RC}) \times ([\eta]_{RC}/[\eta]_{PP})]$ of the weight ratio $(W_{PP}/W_{RC})$ of the propylene homopolymer to the propylene-ethylene copolymer and the intrinsic viscosity ratio $([\eta]_{RC}/[\eta]_{PP})$ thereof is in the range of 1.0 to 3.0.

25. A film formed from the polypropylene composition of claim 11.

26. A multi-layered film wherein the film layer of claim 25 has a functional polymer layer.

27. The multi-layered film of claim 26 wherein the functional polymer layer is a layer processed by using a propylene homopolymer having the density of 0.89–0.91 g/cm$^3$ and the crystalline melting point (Tm) of 165–160° C. and, if desired, an additive, and/or a heat-sealing layer processed by using a propylene-α-olefin copolymer having the density of 0.89–0.91 g/cm$^3$ and the crystalline melting point (Tm) of 159–110° C., and if desired, an additive.

28. A blow molded article formed from the polypropylene composition of claim 11.

29. The blow molded article of claim 28 having a bellows structure.

30. A blow molded article which includes a part from a blow molded article of claim 29 having a bellows structure, and a remaining part from a blow molded article of a polyolefin composition comprising 1–20 wt. % of the ethylene-propylene copolymer containing 25–55 wt. % of the ethylene unit and 99–80 wt. % of propylene homopolymer and further a desired additive.

* * * * *